INVENTOR.
FRANK KESSLER
BY J. Warren Whitesel
ATTORNEY

INVENTOR.
FRANK KESSLER
BY J. Warren Whitesel
ATTORNEY

INVENTOR.
FRANK KESSLER
BY J. Warren Whitesel
ATTORNEY

INVENTOR.
FRANK KESSLER
BY J. Warren Whitesel
ATTORNEY

OUTGOING TRUNK CIRCUIT 500

INVENTOR.
FRANK KESSLER
BY J. Warren Whitesel
ATTORNEY

INVENTOR.
FRANK KESSLER
BY J. Warren Whitesel
ATTORNEY

Feb. 12, 1957 F. KESSLER 2,781,418

AUTOMATIC TELEPHONE SYSTEM

Original Filed Jan. 30, 1953 15 Sheets-Sheet 7

INVENTOR.
FRANK KESSLER
BY J. Warren Whitesel
ATTORNEY

INCOMING SELECTOR S700

INVENTOR.
FRANK KESSLER
BY J Warren Whitesel
ATTORNEY

INVENTOR.
FRANK KESSLER
BY J. Warren Whitesel
ATTORNEY

INVENTOR.
FRANK KESSLER
BY J. Warren Whitesel
ATTORNEY

INVENTOR.
FRANK KESSLER
BY J. Warren Whitesel
ATTORNEY

INVENTOR.
FRANK KESSLER
BY J. Warren Whitesel
ATTORNEY

INVENTOR.
FRANK KESSLER
BY [signature]
ATTORNEY

INVENTOR.
FRANK KESSLER
BY J. Warren Whitesel
ATTORNEY

INVENTOR.
FRANK KESSLER
BY J. Warren Whitesel
ATTORNEY

United States Patent Office 2,781,418

Patented Feb. 12, 1957

2,781,418

AUTOMATIC TELEPHONE SYSTEM

Frank Kessler, Los Angeles, Calif., assignor, by mesne assignments, to General Dynamics Corporation, a corporation of Delaware

Original application January 30, 1953, Serial No. 334,197. Divided and this application January 7, 1954, Serial No. 409,472

3 Claims. (Cl. 179—16)

This invention relates to electro-mechanical telephone systems and more particularly to intertoll dial system. This invention may be used in conjunction with equipment shown in a co-pending application, Serial No. 308,240, filed September 6, 1952 by Leon H. Reagan, now Patent 2,726,285, granted December 6, 1955, both this and the subject application having the same assignee. This application is a division of co-pending application Serial No. 334,197 filed January 30, 1953.

Telephone equipment is arranged for both local and distant calls. In the past, distant calls have been handled by a procedure according to which an operator at a first exchange calls an operator at a second exchange; then the operator at the second exchange completes the call by means of any suitable equipment. If there is electro-mechanical switching equipment at the second exchange, the operator thereat may control this equipment for seizing the called party's line and for signaling thereover. This type of call is known as a "toll call."

Recently, means has been developed for permitting an operator to call a distant exchange, seize automatic equipment thereat and directively control that equipment for seizing and signaling a local called subscriber. In this case, the services of an operator at the distant exchange are no longer required and therefore the originating operator must be provided with means for performing all necessary functions which formerly had been controlled locally by the operator at the distant exchange. This type of call is known as "intertoll dialing."

Some difficulty has arisen due to the fact that toll and intertoll calls must be treated differently. One solution might be to provide duplicate sets of equipment at the distant office, one set being used on toll calls, and the other set being used for intertoll dialing; however, this solution is expensive and seriously reduces the flexibility of the telephone equipment. On the other hand, my invention provides means for using the same equipment on all types of calls. For example, on intertoll calls, the originating operator may control ringing and the disposition of coins by means of the same equipment used on toll calls. Furthermore, all necessary supervisory signals are returned in each case.

An object of this invention is to provide an improved method of controlling pad insertion.

This and other objects will be apparent to those skilled in the art after having studied the following description when taken in connection with the accompanying drawings in which Fig. 1A shows a block diagram of how the circuit functions;

Figs. 1–3, when properly joined, show an intertoll trunk circuit for terminating a two-way trunk line;

The circuits of Figs. 1–14 illustrate the battery connections by conventional symbols. As is the case in most telephone circuits, the positive terminal is described as connected with ground. For this reason, I refer to the negative pole as (−) battery and the positive pole as grounded (+). It should be understood that this condition could be reversed or that any other well-known power source may be used without changing my invention.

*Brief description*

Figure 1:
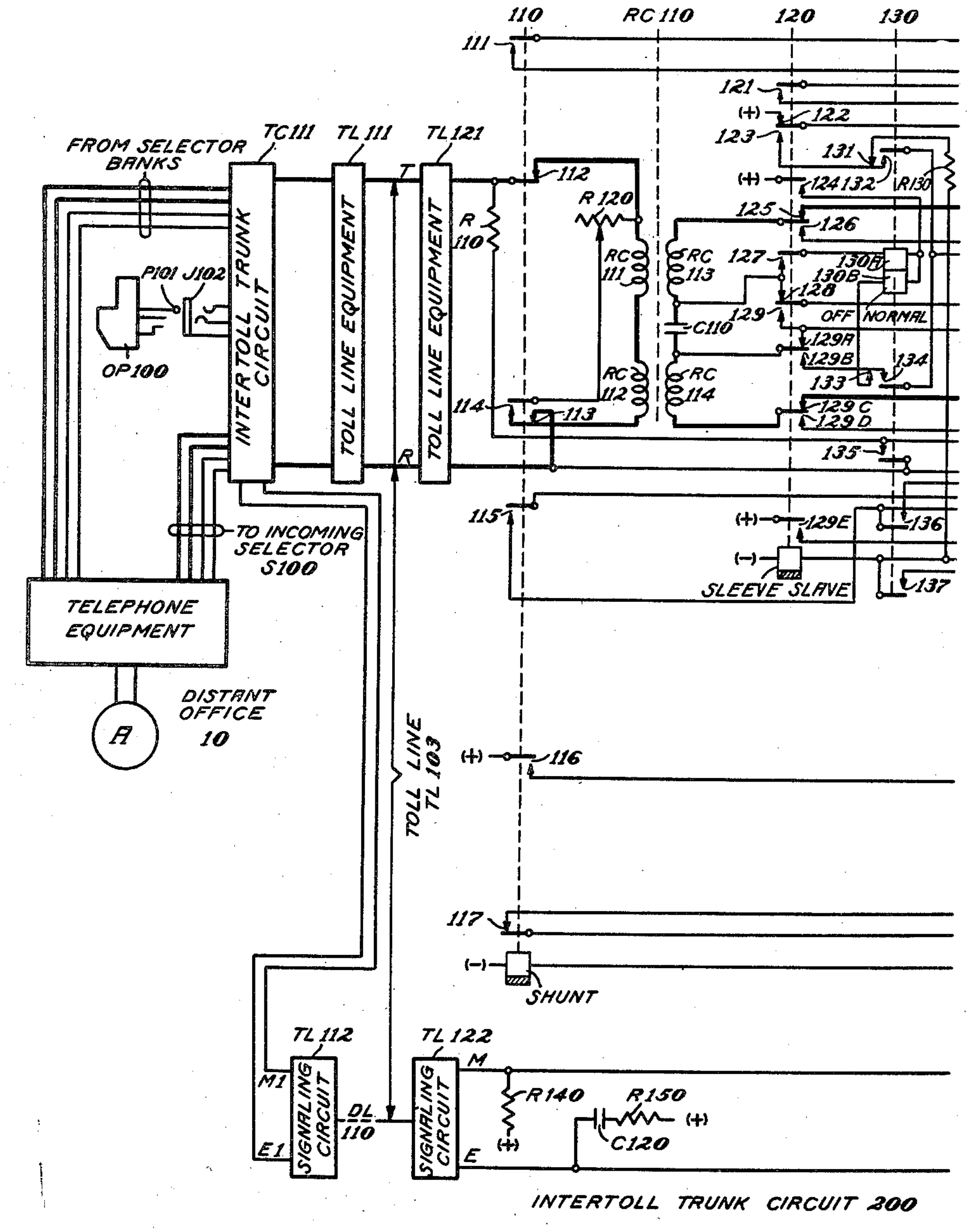
Figure 1A:
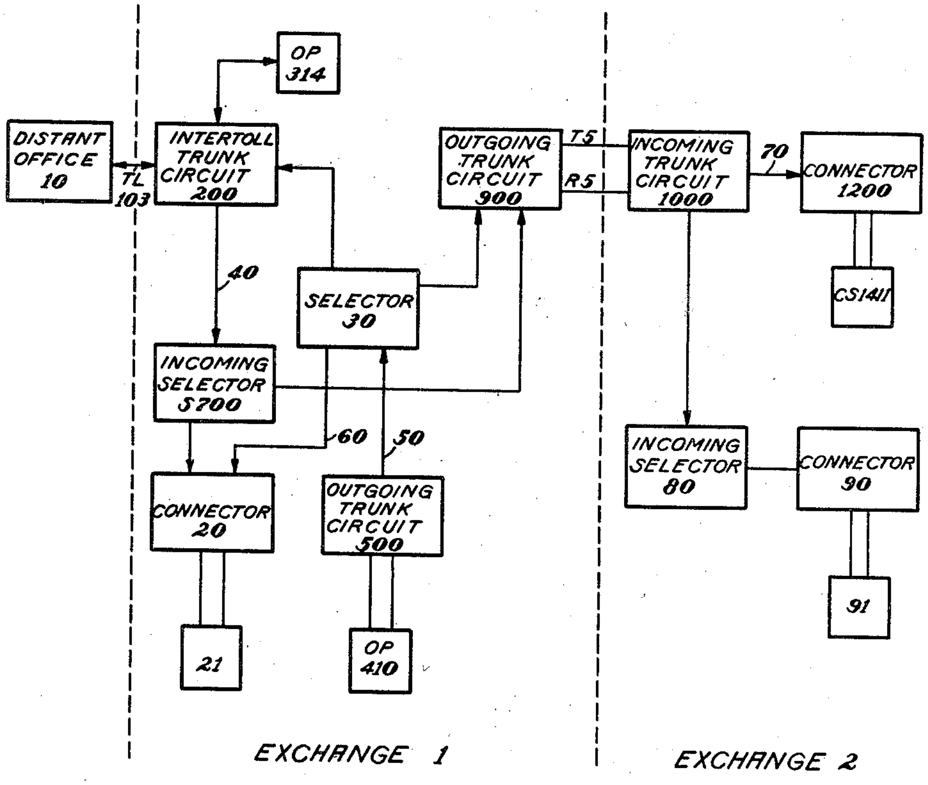
Figure 15:
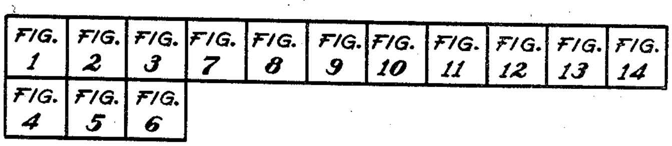
Fig. 15 shows how the remainder of the drawings should be arranged to form a complete circuit.

Fig. 1A is a schematic diagram to illustrate the manner in which various calls may be made. One type of call is that which extends from distant office 10 over toll line TL103 to intertoll trunk circuit 200. Incoming selector S700 may be seized and operated from distant office 10 either to complete a call local to exchange 1 by way of connector 20 or to complete a tandem call to a still more distant office, exchange 2, by way of outgoing trunk circuit 900 and conductors T5 and R5. In the case of a local call, trunk circuit 200 repeats digit pulses received over toll line TL103 to step incoming selector S700 to a desired level after which it searches in its secondary direction for idle equipment, such as connector 20, for example. Further digit pulses are repeated by trunk circuit 200 and by incoming selector S700 to connector 20 for seizing a called subscriber 21. Proper supervision signals are returned in the event that selector S700 reaches its overflow position without finding idle equipment and also in the event that called subscriber 21 is busy. In the case of tandem calls, all digit pulses received from distant office 10 are repeated by incoming selector S700, outgoing trunk circuit 900 and incoming trunk circuit 1000.

Another type of call is that which originates in exchange 1. In this case operator OP410 may utilize outgoing trunk circuit 500 for operating selector 30 which may seize connector 20 for completing a local call, or which may seize outgoing trunk circuit 900 for calling exchange 2, or which may seize intertoll trunk circuit 200 for calling distant office 10.

Still another type of call which may originate in exchange 1 is one by way of a calling operator OP314 who may seize intertoll trunk circuit 200 directly, following which she may transmit suitable switch directing signals over toll line TL103 for setting a switch train in distant office 10. Or, operator OP314 may call another operator in distant office 10 without the use of any intervening switch trains.

In each of the calls, means is provided for extending and returning all necessary supervision signals such as overflow, busy line, coin collect and refund, and automatic and delayed ringing.

Figure 2:
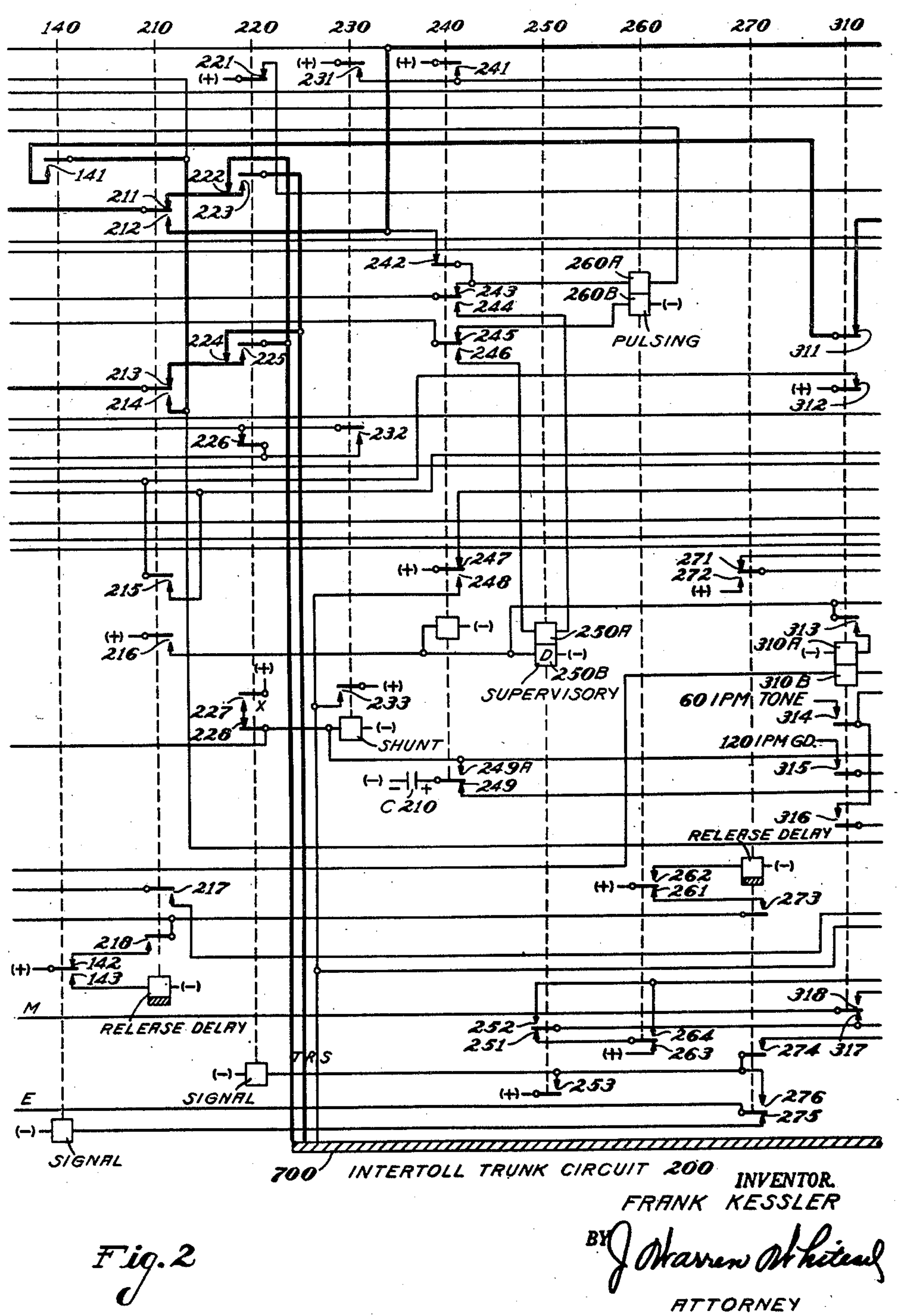
Figure 3:
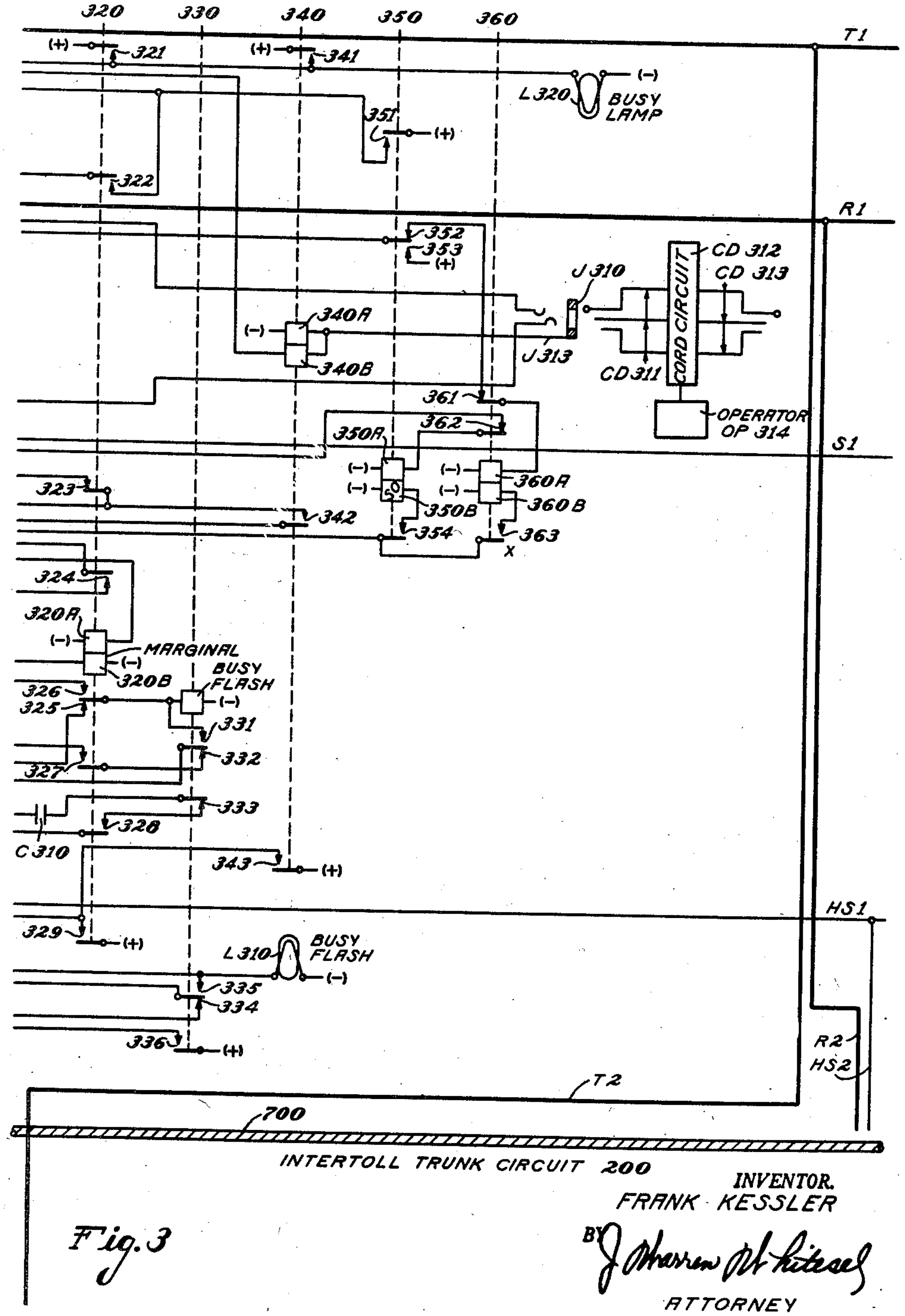
Figure 4:
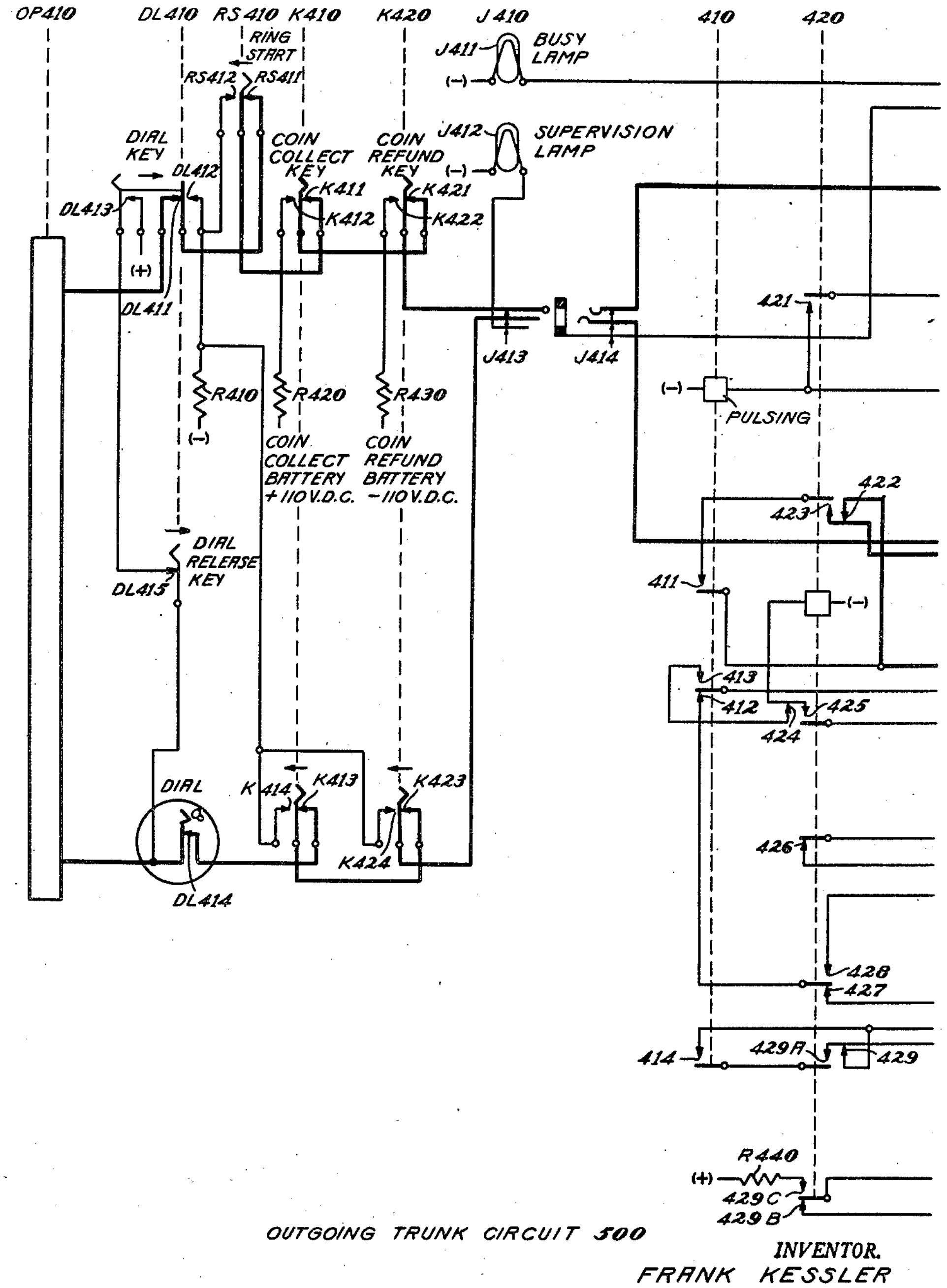
Figs. 4, 5 and 6 show an outgoing trunk circuit for use by a toll operator.
Figure 5:
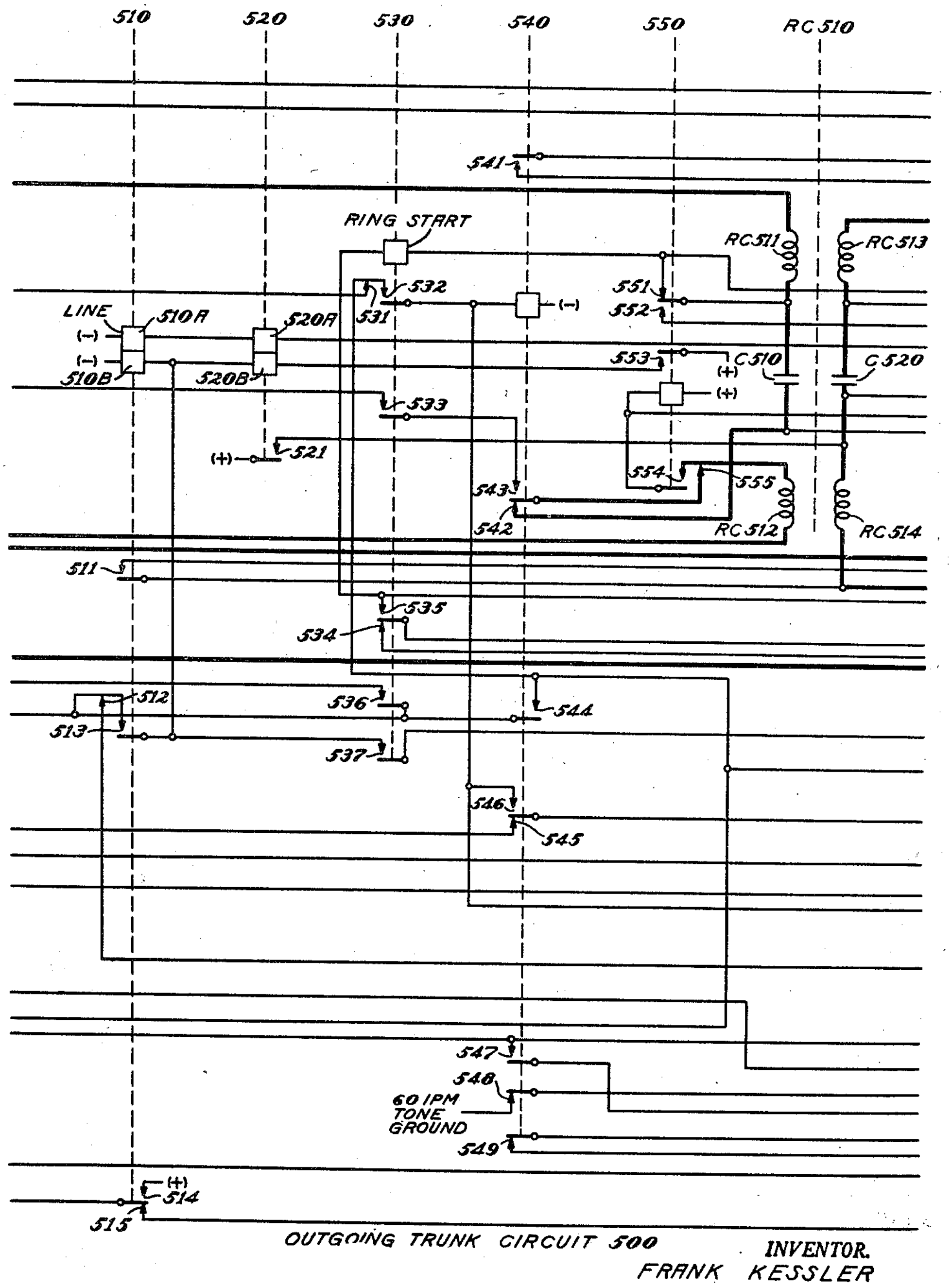
Figure 6:
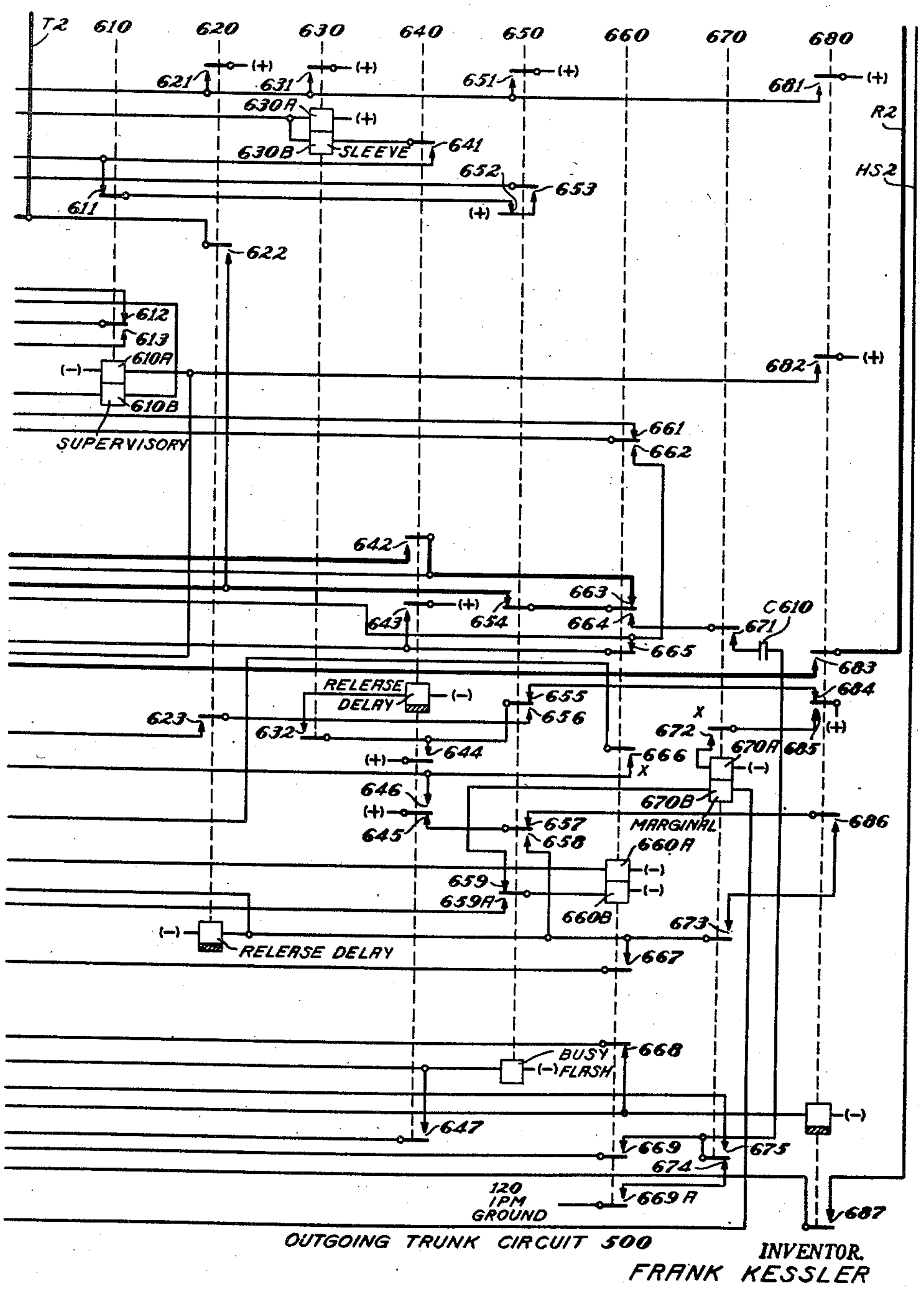
Figure 7:
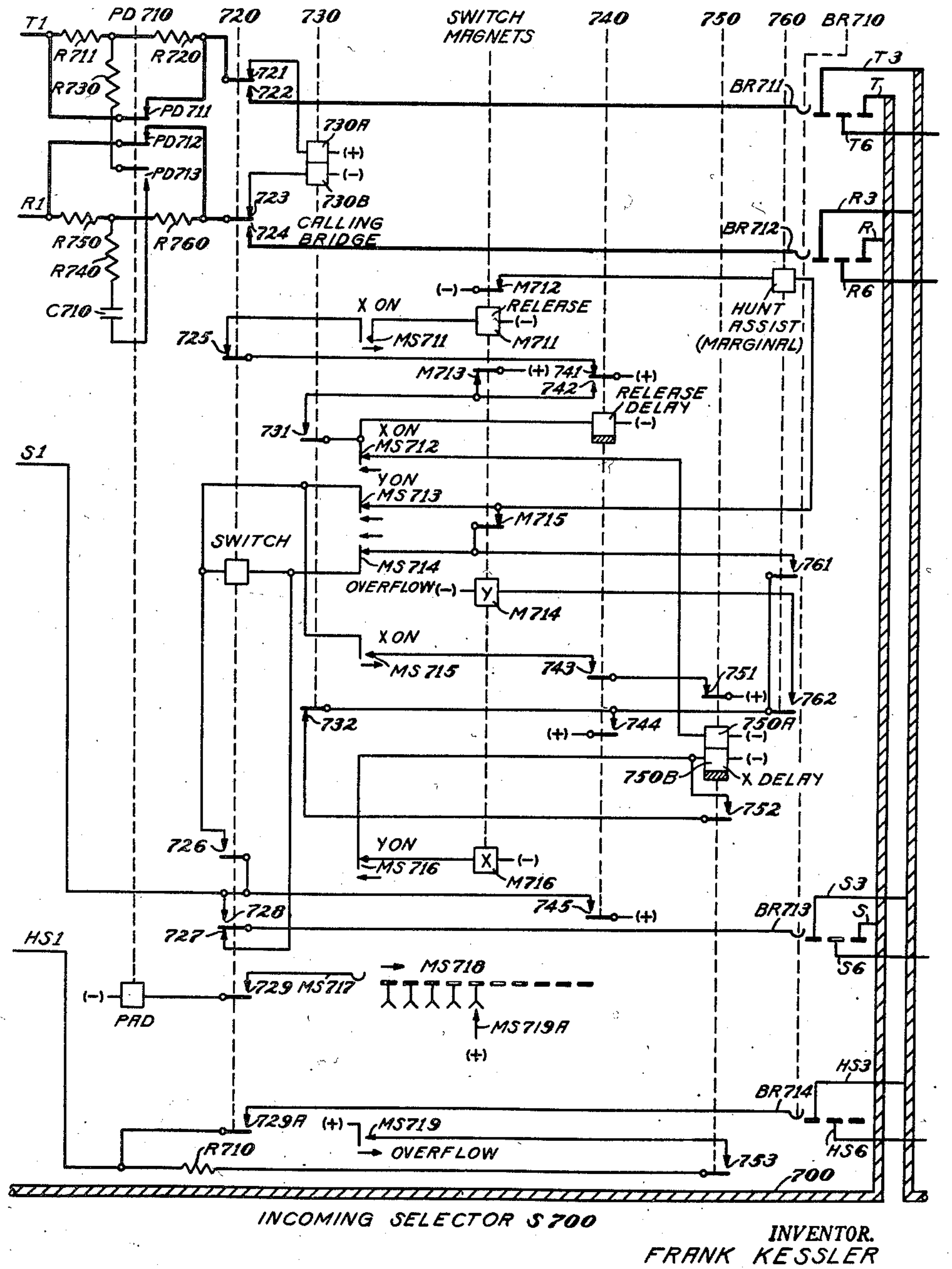
Fig. 7 shows an incoming selector which may be used in connection with local, toll and intertoll calls.
Figure 12:
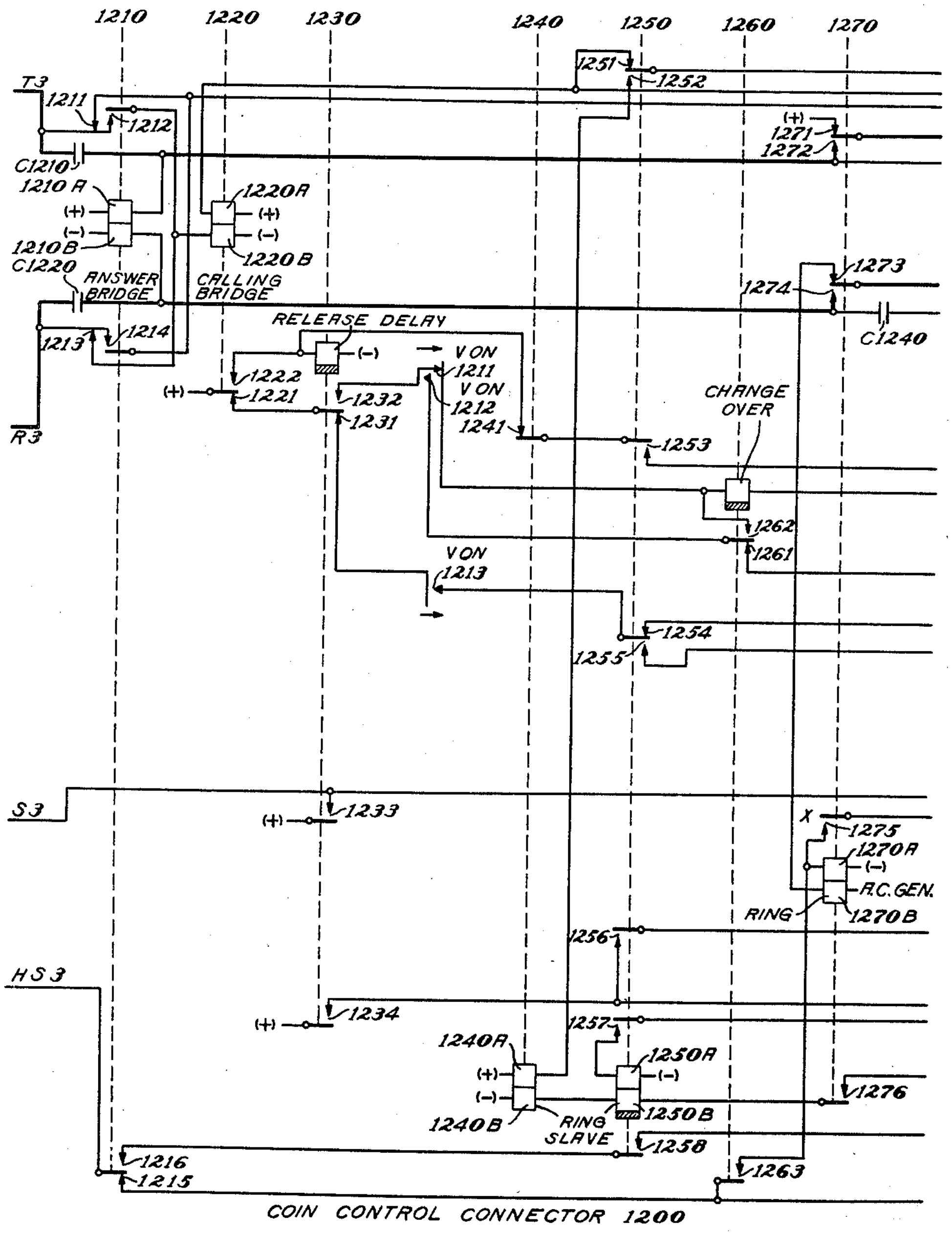
Figs. 12, 13 and 14 show a coin control connector switch which may be used on local, toll, intertoll and tandem calls.
Figure 13:
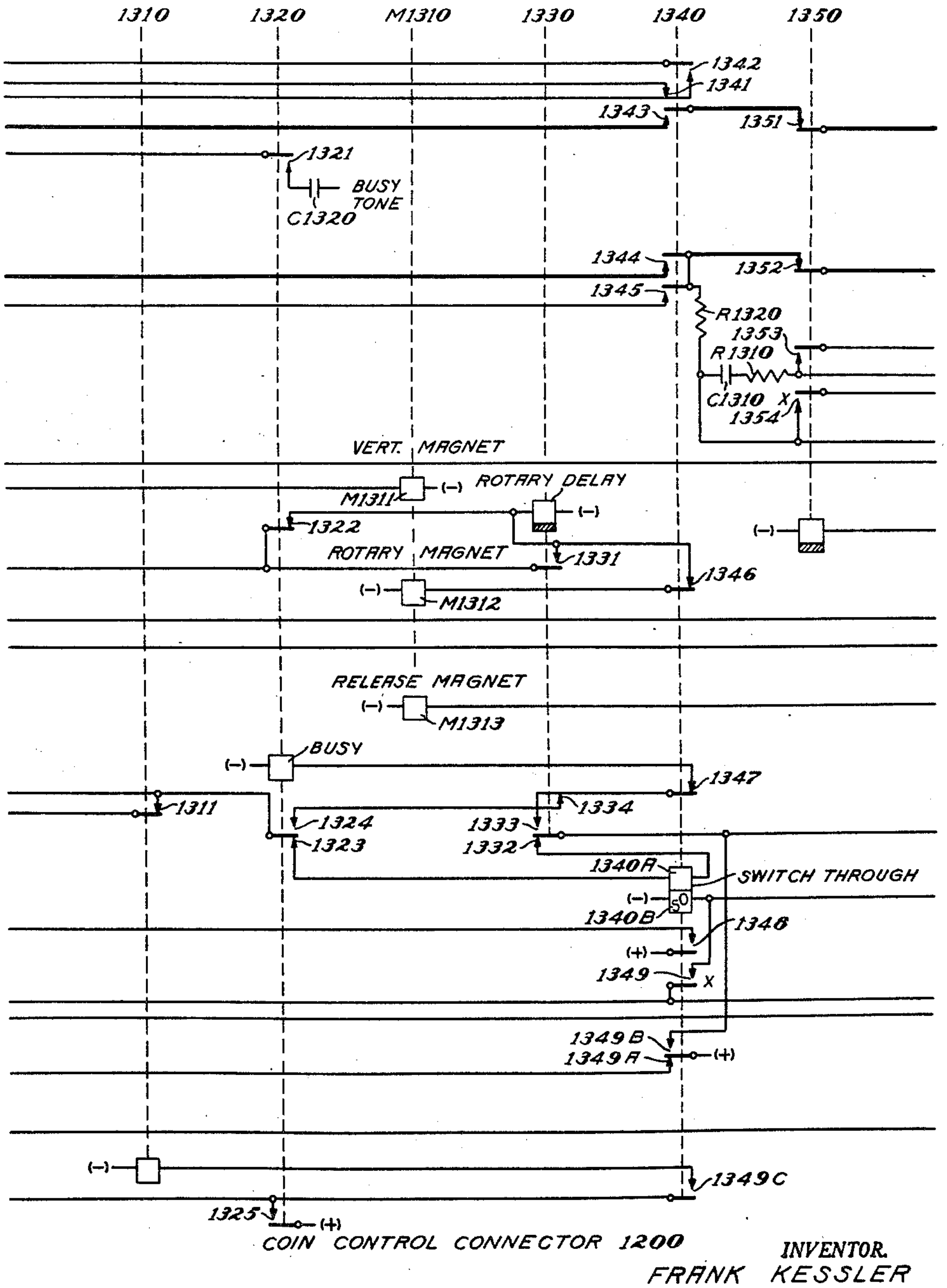
Figure 14:
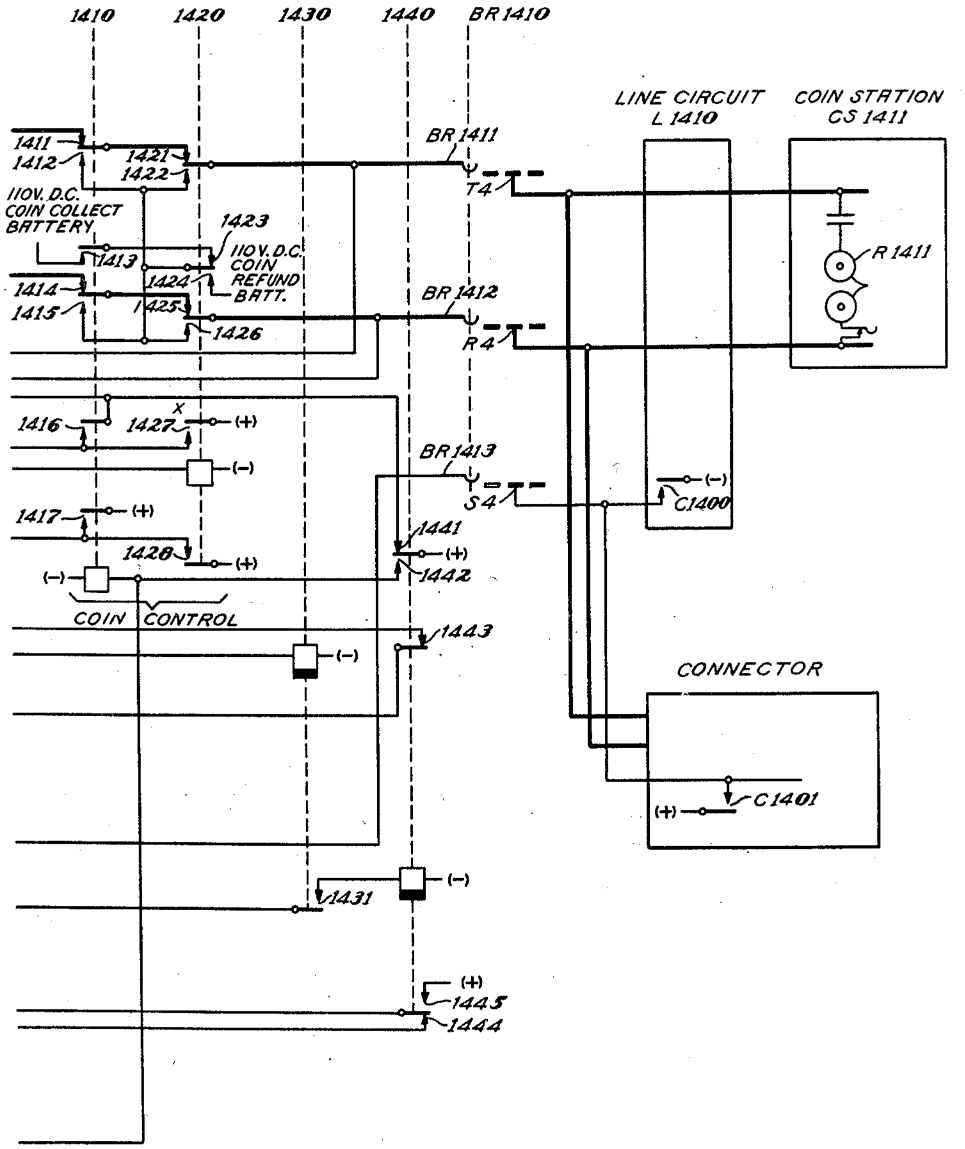

It is thought that a more complete understanding will be had by a detailed description of Figs. 1–14 which show the specific circuits of elements illustrated in Fig. 1A as hollow rectangles. For example, distant office 10, shown in Fig. 1, may include operator position OP100 which has access to toll line TL103 by way of an intertoll trunk circuit TC111 and any suitable toll line equipment TL111. In some instances, intertoll trunk circuit TC111 may be seized directly by a switch train included in telephone equipment at the distant office. Similarly, either operator OP100 or the equipment in the distant office may be seized from intertoll trunk circuit TC111. Intertoll trunk circuit 200, which may be the same as circuit TC111, is shown in Figs. 1–3. Operator OP410 is shown near the left of Fig. 4, while outgoing trunk circuit 500 is shown in Figs. 4–6. Operator OP314 is shown near the right of Fig. 3. To avoid having to show two selectors and two connectors, it is assumed that both of the selectors 30 and S700 are identical and therefore only one is shown in Fig. 7. It should be understood that the selector shown in Fig. 7 may be seized either from over conductors T1, R1, S1 and HS1 which represent cable 40 (Fig. 1A) or over conductors T2, R2 and HS2 which represent cable 50 (Fig. 1A). In like manner, connectors 20 and 1200 are assumed to be identical and therefore only one is shown in Figs. 12–14. In this case, cable 60 (Fig. 1A) represents cable 800 in Figs. 8–11, and cable 70 (Fig. 1) represents the conductors connecting Figs. 11 and 12. Outgoing trunk circuit 900 is shown in detail in Figs. 8 and 9 while incoming trunk circuit 1000 is shown in detail in Figs. 10 and 11.

*Seizure*

The first call to be described is one in which an operator OP100 receives a call in any conventional manner—such as by way of a plug and jack arrangement or automatic switch train, for example (neither of which is shown)—for coin telephone CS1411, which in this case corresponds to subscriber 21 in Fig. 1A. She learns that the call is for another office which may be reached by way of a toll line such as TL103, for example. Therefore to forward this call, she first interconnects plug P101 and jack J102 thereby seizing intertoll trunk circuit TC111. The other end of toll line TL103 is signaled by any conventional means so that toll line TL103 may be marked busy thereat, thus preventing the possible interconnection occasioned by two calls seizing the same trunk simultaneously from both ends. These operations may involve any suitable equipment at operator position OP100, such as that shown by the copending application of Leon H. Reagan 308,240, filed September 6, 1952, now Patent 2,726,285 for example.

Assuming that a device such as that shown by Reagan is used, signaling circuit TL112 is provided with M1 and E1 leads over which a seizure signal is extended and then over dial leg conductor DL110 to signal circuit TL122 where the E conductor is marked, thereby operating signal relay 140 (Fig. 2). Operation of signal relay 140 energizes release delay relay 210 from grounded (+) through operated contacts 143, and the winding of relay 210 to (—) battery. Since digit pulses are to operate and release signal relay 140 alternately, it is necessary to provide a slow release holding relay such as 210, which will not restore during intermittent pulsing, if equipment is not to be released. Therefore, relay 210 operates and holds such equipment. For example, the operation of relay 210 connects grounded (+) from normally closed contacts 312 (Fig. 2), through operated contacts 215, to outgoing conductor S1, to hold the incoming selector switch of Fig. 7 when it operates. Operation of release delay relay 210 also connects grounded (+) from operated contacts 216 to (—) battery by way of winding 250B on the supervisory relay; however, this relay does not operate at this time since it is differentially wound and since there is not enough flux in the lower winding alone to pull the relay. Relay 240 operates from grounded (+) through operated contacts 216, and the winding of relay 240 to (—) battery and in turn connects a ground marking to conductor S over a path which may be traced from grounded (+) through operated contacts 248. This marking prevents seizure of intertoll trunk circuit 200 by another call from an outgoing selector. Operation of relay 240 also lights busy lamp L320 from grounded (+) through operated contacts 241, and busy lamp L320 to (—) battery, thereby guarding visibly against seizure by an operator such as OP314, for example, by interconnecting plug CD311 and a jack J310.

Returning to the operation of signal relay 140 means is provided, responsive thereto, for seizing and preparing incoming selector S700 so that it may be effective later when switch directing pulses are received. That is, calling bridge relay 730 is energized from grounded (+) through winding 730A, normally closed contacts 721 and PD711, conductor T1, operated contacts 212, normally closed contacts 125, repeating coil winding RC113, normally closed contacts 128, operated contacts 244, winding 250A of the differentially wound supervisory relay, operated contacts 246, normally closed contacts 129A, repeating coil winding RC114, normally closed contacts 129C, operated contacts 214 and 141, normally closed contacts 311, conductor R1, contacts PD712 and 723, and winding 730B to (—) battery. Differentially wound supervision relay 250 does not operate at this time due to the direction in which the current flows. Operation of calling bridge relay 730 energizes release delay relay 740 from grounded (+) through normally closed release magnet contacts M713, and operated contacts 731 to (—) battery by way of the winding of relay 740. Here again a slow release holding relay is necessary to hold switch S700 and other equipment during subsequent pulsing; therefore operation of relay 740 connects grounded (+) through operated contacts 745 to the sleeve S1. Operation of release delay relay 740 also removes grounded (+) at normally closed contacts 741 to prevent the operation of release magnet M711 which otherwise might release selector switch S700 before the call is completed. Calling bridge relay 730 further prepares selector switch S700 by energizing the X delay relay, 750, from grounded (+) through normally closed contacts M713, operated contacts 731, normally closed X off-normal contacts MS712, and winding 750A to (—) battery. This operation of X delay relay 750 prepares a pulsing circuit to X magnet M716 via contacts 752 (magnet M716 is not operated since contacts 732 are now open).

*Dialing first digit*

Selector switch S700 is now prepared to receive switch directing signals. Briefly, the operator at position OP100 proceeds to transmit digit signals in any suitable manner such as by pulsing over conductor M1 and dial leg DL110 to signal circuit TL122 where the signal pulses are repeated to conductor E for pulsing signal relay 140, thereby opening and closing contacts 141 to which calling bridge relay 730 responds. Contacts 732 follow these pulses to open and close the operating path to the X magnet for moving selector S700 in its primary motion. During this pulsing period X delay relay 750 holds; however, after the receipt of the last pulses, it releases to switch the stepping circuit for moving the switch in the Y direction.

More specifically, as relay 140 restores intermittently responsive to the incoming pulses on conductor E, slow release shunt relay 110 is energized intermittently from rounded (+) on contacts 142, through operated contacts 218, and the winding of shunt relay 110 to (—) battery. Relay 110 operates and energizes a second shunt relay 230 over a path which may be traced from grounded (+) through operated contacts 116 and the winding of relay 230 to (—) battery. This relay operates to place a multiple marking on busy lamp L320 and on conductor S of cable 700. Electrolytic capacitor C210 is charged from grounded (+) on contacts 116 through operated contacts 249A of switch relay 240; however, this device has no utility at this time. At contacts 112 and 113, shunt relay 110 opens the circuit extending between toll line equipment TL121 and repeating coils RC111 and RC112. Resistor R110 remains connected across the toll line by way of operated contacts 232 and 226 in parallel. This is to compensate for the removal of the repeating coil windings RC111 and RC112 while pulses are being received, and to eliminate the momentary unbalancing effect of intermittent pulses on toll line equipment such as TL111 and TL121, for example. In addition to the foregoing, shunt relay 110 also closes contacts 115 to connect grounded (+) from closed contacts 312 and 115 to outgoing conductor S1 in parallel with contacts 215. This is to hold succeeding equipment in an operated condition. The operation of relay 110 also connects variable resistor R120 across repeating coil windings RC111 and RC112 at operated contacts 114; however, this device has no utility at this time since it relates to the correction of pulsing characteristics on outgoing calls.

For the purpose of explanation, it will be assumed that the first digit to be dialed is the digit 1. It may be recalled that the pulsing path to calling bridge relay 730 is traced from grounded (+) through winding 730A, contacts 721 and PD711, conductor T1, contacts 111, 141 and 311, conductor R1, contacts PD712 and 723 to (—) battery via winding 730B. Responsive to the digit pulse, signal relay 140 opens and closes contacts 141 once to release and reoperate calling bridge relay 730 once which in turn closes contacts 732 once to energize the X magnet M716 causing selector switch S700 to take one step. The operating path for X magnet M716 extends from grounded (+) through operated contacts 744, normally cloesd contacts 732, operated contacts 752, and normally closed Y off-normal contacts MS716 to (—) battery through the winding of X magnet M716. The grounded (+) marking from operated contacts 744 is also connected to winding 750B each time calling bridge relay 730 restores contacts 732; therefore, relay 750 remains operated due to its slow release characteristic even though the original operating path for coil winding 750A is opened at X off-normal contacts MS712 as the switch takes its first step in the X direction.

Following the receipt of the first pulse train, contacts 732 remain open and selector switch S700 prepares for its secondary motion. That is, in the case of the digit 1 assumed above, contacts 732 are opened responsive to seizure, closed once responsive to a pulse received over conductor E and opened again responsive to the termination of that pulse. It might be worth noting that shunt relay 110 also releases after its slow release time interval since contacts 142 remain open after the receipt of the last digit pulse. After contacts 732 have been open longer than the slow release time interval of relay 750, it restores to energize hunt assist relay 760 from grounded (+) through now closed contacts 751, operated contacts 743, operated X off-normal contacts MS715 and resting Y off-normal contacts MS713, the winding of hunt assist relay 760, and normally closed contacts M712 to (—) battery. Upon operating, relay 760 closes a holding circuit to itself from grounded (+) through operated contacts 744 and 761, normally closed contacts M715, the winding of hunt assist relay 760 and normally closed contacts M712 to (—) battery. A path is now completed for operating Y magnet M714 including (—) battery, the winding of Y magnet M714, closed contacts 762 and 744 to grounded (+). This pulls the Y magnet to step brushes BR710 one step in the secondary or Y direction and also to open Y interrupter springs M715 thereby opening the holding circuit for relay 760. This in turn opens contacts 762 thereby restoring Y magnet M714 and closing interrupter contacts M715.

The next operation depends upon whether an idle trunk is found as selector S700 hunts out during the cyclic operation of the hunt assist relay and the Y magnet. For example, if the first bank contact encountered by brush BR713 is connected to ground due to a busy condition, hunt assist relay 760 reoperates from the busy ground through connected brush BR713, normally closed contacts 727, overflow springs MS714 and Y interrupter springs M715, to the winding of relay 760, and normally closed contacts M712 on release magnet M711 to (—) battery. Relay 760 reoperates again to energize Y magnet M714 stepping the switch brushes including BR713 to the second bank contact. Once more relay 760 de-energized when Y interrupter contacts M715 open. This cyclic operation of relay 760 and Y magnet M714 continues either until an overflow position is reached or until an idle trunk is found.

*Overflow*

First, let it be assumed that brush BR713 encounters a busy ground on every step. The switch then hunts out to the end of its level after which various overflow springs open. Springs MS714 open to break the path to hunt assist relay 760, thus stopping the switch. Switch relay 720 does not operate at this time since ground is connected to both sides of its winding; one being from brush BR713 over contacts 727, and the other being by way of contacts MS715, 743 and 751.

Overflow contacts MS719 are operated to transmit a signal to operator position OP100 as an indication of overflow. More specifically, grounded (+) is connected through operated overflow contacts MS719, contacts 753, resistor R710, conductor HS1, operated contacts 217, closed contacts 117, and windings 310B and 320B of the direct ground relays to (—) battery. It should be noted that marginal relay 320 is designed not to operate in this circuit since resistor R710 limits the current flow to below the level which is necessary for this relay's operation. However, relay 310 does operate to complete a locking circuit for itself from grounded (+) on operated contacts 216, through closed contacts 313 and winding 310A to (—) battery. Relay 310 also connects ground interrupted at the rate of 120 times per minute to busy flash relay 330 through operated contacts 315 and normally closed contacts 325. As relay 330 follows each 120 I. P. M. pulse, the grounded (+) normally connected to signaling lead M through closed contacts 318, 334, 251 and 263, is replaced by (—) battery through resistance lamp L310 and operated contacts 335 and 318; hence, it is seen that signaling lead M is alternatively switched between ground and battery to produce a visible overflow indication at operator position OP100.

Means is provided for restoring equipment responsive to overflow. That is, direct ground relay 310 opens the holding loop for calling bridge relay 730 at contacts 311. This causes relay 730 to release which in turn restores selector switch S700 to its normal condition. More specifically, contacts 731 open and after a slight delay, relay 740 releases to complete an operate path to release magnet M711 from grounded (+) through normally closed contacts 741 and 725, operated X off-normal contacts MS711 to (—) battery by way of release magnet M711. Release magnet M711 opens its contacts M713 and M712 to prevent any possible reoperation of relays 740 and 760 during the mechanical release procedure. Still another function of relay 310 is to remove the busy marking from selector S700 by opening contacts 312 to remove the holding ground from sleeve S1.

The calling operator now restores the intertoll trunk by opening the holding ground on E conductor thus restoring relay 140 and all other equipment used in the dialing procedure.

*Idle trunk found*

Assuming next that a free circuit is found by selector S700 as it moves in its secondary motion responsive to the cyclic operation of the hunt assist relay and the Y magnet, no ground is connected to brush BR713 when it stops. Switch relay 720 operates from grounded (+) through normally closed contacts 751, operated contacts 743, operated X off-normal springs MS715, the winding of relay 720, overflow springs MS714, contacts M715, the winding of relay 760 and normally closed contacts M712 to (—) battery. It might be noted that switch relay 720 did not operate on busy lines since the operating battery was shunted to busy ground on brush BR713 at contacts 727. Hunt assist relay 760 is designed so that it will not operate in series with the winding of relay 720; therefore, the cyclic operation is broken and the switch stops. Operation of switch relay 720 opens contacts 721 thereby disconnecting conductor T1 from winding 730A. In a similar manner, contacts 723 disconnects the R1 conductor and winding 730B, releasing relay 730. At contacts 722 and 724, relay 720 connects conductors T1 and R1 to brushes BR711 and BR712 thus completing the talking path through selector S700. Upon restoring, calling bridge relay 730 opens contacts 731 thereby releasing relay 740 which opens contacts 745 after a brief interval determined by the slow release characteristic of relay 740 to remove the grounded (+) marking from sleeve conductor S1 since by this time a grounded (+) marking will have been received from the next equipment over brush BR713 and extended through operated contacts 728. Release magnet M711 is prevented from operating responsive to the release of relay 740 since contacts 725 are opened by switch relay 720. Relay 720 locks to grounded (+) from operated contacts 745 through 726 during the interval between the opening of contacts 727 and the application of ground to conductor S3 by the next circuit. Conductor HS1, from the preceding circuit, is now connected through operated contacts 729A and brush BR714 to conductor HS3.

Pad control is by way of element MS718 which is an auxiliary or "X bank" of selector S700; that is, each time that switch S700 advances in the primary direction, brush MS717 is advanced a step over contact bank MS718. If grounded (+) is connected by wiring MS719A to that contact on which brush MS717 is resting, pad relay PD710 is energized over an obvious path including contacts 729 when relay 720 operates. Relay PD710 opens contacts PD711 and PD712 to connect a transmission pad comprising resistors R711—R760 to conductors T1 and R1 for equalizing transmission efficiency in the network of offices. Wiring MS719A may be used on any level which is appropriate.

*Connector operation*

To review briefly, a call has been placed for a subscriber in a distant office by operator position OP100. The operator interconnected plug P101 and jack J102 thereby extending the call to selector S700 by way of intertoll trunk circuit 200. She then dialed the proper digits for directing selector S700 in its primary or X direction after which it automatically is caused to search in its secondary or Y direction for an idle connector. If none was found, selector S700 released and an overflow signal was returned in the form of 120 I. P. M. flashes; however, if an idle connector was found, relay 720 operated to switch through. Therefore, assuming that switchthrough has occurred, the connector is ready to complete the call to a called subscriber. For the purpose of explaining this invention, it is assumed that coin control connector 1200 is to be used. This switch may be different from selector S700 in that the selector is a flat type two motion step-by-step switch of the type which is sold under the trademark "XY," while connector 1200 may be a vertical-rotary two motion step-by-step switch.

Following the operation of switchthrough relay 720, a pulsing loop is completed to the calling bridge relay 1220 of connector 1200. That is, the loop circuit formerly holding the calling bridge relay 730 of selector S700 is now transferred by the operation of contacts 722 and 724, to conductors T3 and R3 which are connected to Fig. 12 by way of cable 800. Calling bridge relay 1220 operates over the path from grounded (+) through winding 1220A, normally closed contacts 1341 and 1211, the loop including conductor T3, brush BR711 and contacts 722, 111, 141, 311 and 724 and back over brush BR712 and conductor R3 to normally closed contacts 1213, and (—) battery through winding 1220B. Operation of relay 1220 energizes release delay relay 1230 from grounded (+) through operated contacts 1222 and the winding of release delay relay 1230 to (—) battery. Operation of relay 1230 connects grounded (+) through operated contacts 1233 to incoming conductor S3 thereby holding the preceding equipment in its operated position.

Connector switch 1200 is now prepared to receive two additional digit pulse trains which operator OP100 may transmit. Again, relay 140 intermittently opens the pulsing loop at contacts 141 as each digit pulse is received over conductor E. Relay 1220 follows by restoring on each such pulse. During this pulsing, contacts 1222 open and close; however relay 1230 does not restore due to its slow release characteristic. As calling bridge relay 1220 restores on the first digit pulse, vertical magnet M1311 and changeover relay 1260 operate in series from grounded (+) through closed contacts 1221, operated contacts 1232, closed vertical off-normal contacts VON-1211, and through the windings of relay 1260 and vertical magnet M1311, to (—) battery. As brushes BR1410 move one step in the vertical direction, off-normal contacts VON1211 are opened and contacts VON1212 are closed. During each succeeding pulse, vertical magnet M1311 is operated to elevate brushes BR1410; however, changeover relay 1260 remains operated during the succeeding intermittent pulses due to its slow release characteristics. After contacts VON1211 open, the operating grounded (+) for vertical magnet M1311 is by way of closed contacts 1232, VON1212 and 1262, and the windings of changeover relay 1260 and vertical magnet M1311 to (—) battery.

When the first digit pulse train is completed, changeover relay 1260 restores to transfer the pulsing circuit to rotary magnet M1312 at contacts 1261. As calling bridge relay 1220 restores on the first pulse of the second digit, rotary magnet M1312 and rotary delay relay 1330 operate from grounded (+) through closed contacts 1221, operated contacts 1232 and VON1212, normally closed contacts 1261, 1322 and 1346 to (—) battery by way of rotary magnet M1312 and in parallel therewith through the winding of rotary delay relay 1330. Upon operating, relay 1330 completes a holding circuit for itself through operated contacts 1331, so that it remains operated during the second digit pulses due to its slow release characteristic. Operation of relay 1330 also connects brush BR1413 to busy relay 1320 over the path extending from brush BR1413 through operated contacts 1333, normally closed contacts 1347 and the winding of busy relay 1320 (—) battery. Rotary magnet M1312 operates on each pulse in the last digit pulse train, thereby rotating the switch into connection with the called line.

*Called line busy*

If the called line is busy, bank contact S4 is connected to ground and busy relay 1320 operates from ground forwarded from contact C1401 from another connector through bank contact S4, brush BR1413, operated contacts 1333 and normally closed contacts 1347 to (—) battery through relay 1320. Rotary delay relay 1330 restores after a brief interval of time determined by its slow release characteristics following the completion of the second digit. However, busy relay 1320 remains operated from grounded (+) through operated contacts 1233 and 1324, normally closed contacts 1334 and 1347, and through the winding of relay 1320 to (—) battery. At contacts 1322, relay 1320 opens the operating circuit to rotary delay relay 1330 and rotary magnet M1312. Busy tone is returned through capacitor C1320 and operated contacts 1321, to incoming conductor T3 to indicate an in-use condition to a local calling party; however, this signal has no purpose at this time since the call originated at a distant office.

To return a busy signal to an intertoll operator, it is necessary to transmit suitable pulses over the M conductor. For this purpose, relay 1320 operates on connection to a busy line to close contacts 1325 thereby extending a grounded (+) marking over contacts 1215, conductor HS3, cable 800, brush BR714, operated contact 729A, conductor HS1, contacts 217, 117 to (−) battery by way of relays 310 and 320 in series. Relay 310 and marginal relay 320 operate in series. Upon operation, direct ground relay 320 closes a holding circuit for itself from grounded (+) through operated contacts 216 and 324, normally closed contacts 271, and winding 320A to battery. When both direct ground relays 310 and 320 operate, a source of 60 impulses per minute is connected through operated contacts 314 and 326 to (−) battery through the winding of busy flash relay 330. Relay 330, now intermittently operating at 60 I. P. M., alternately connects the M conductor between (−) battery by way of resistance lamp L310 and grounded (+) at contacts 334 and 335. This controls a visual indication to calling operator OP100 that the called telephone is in use. Operation of direct ground relays 310 and 320 also connects a tone which is superimposed on the 60 I. P. M. ground source to conductor T of the toll trunk, the tone being connected through operated contacts 314 and 316, capacitor C310, normally closed contacts 333, operated contacts 328, 214, normally closed contacts 129C and repeating coil winding RC114 for an audible indication to the calling operator that the called telephone is in use.

Incidentally, it may be recalled that on calls where selector S700 encountered an all trunks busy condition on overflow a similar marking is forwarded; however, in this case the busy marking from selector S700 is by way of contacts MS719 and 753 and by resistor R710 which is sufficient to keep marginal relay 320 from operating. Stated another way, means is provided in the intertoll trunk circuit for distinguishing between the types of busy condition by the inclusion or exclusion of resistor R710 as it controls the operation of marginal relay 320. If relay 320 does not operate 120 I. P. M. is connected to busy flash relay 320 while if relay 320 does operate 60 I. P. M. is connected. The operator distinguishes by the rate of flashing. For a description of all trunks busy, see the section above entitled "Overflow."

The calling operator now restores intertoll trunk circuit 200 to its normal condition as will be described later in the section entitled "Release."

*Called line idle*

Assuming that the called line is idle, when seized by connector 1200, a circuit must be closed for signaling the called subscriber. That is, connector 1200 steps out under the direction of the second digit pulse train. Brush BR-1413 comes to rest on the sleeve contact individual to the called line and since the line is idle a (−) battery marking is connected from contacts C1400 to complete a circuit for energizing switchthrough relay 1340, the circuit being traced from brush BR1413 through contacts 1332, the winding of relay 1340 to grounded (+) through contacts 1323 and 1233. Relay 1340 operates and locks at contacts 1349 to grounded (+) through contacts 1234. Contacts 1349B connect grounded (+) to brush BR1413 thereby marking coin station CS1411 busy to other connector switches corresponding to connector 1200. Relay 1340 also connects grounded (+) to brush BR1411 from normally closed contacts 1271, through operated contacts 1343, normally closed contacts 1351, 1411 and 1421, brush BR1411, bank contact T4, line circuit L1410, to coin station CS1411 which has ringer R1411 bridged across line conductors T4 and R4 for audible signaling the called party, the ringing circuit being further completed by way of conductor R4, brush BR1412, contacts 1425, 1414, 1352, 1344 and 1273 to an A. C. generator through winding 1270B. Relay 1340 also connects the output of an A. C. generator through winding 1270B, normally closed contacts 1273, operated contacts 1344 and 1345, capacitors C1240 and C1220, and to incoming conductor R3 for returning an audible tone to calling operator OP100 each time that ringing current is projected from the A. C. generator to conductor R4. Switchthrough relay 1340 also transfers incoming conductor T3 to include contacts 1251 in the connection to winding 1220A. These contacts will be explained later in the section headed "Coin Control."

The called party hears ringer R1411 and responds by removing his receiver, or handset, thereby terminating ringing. More specifically, the ringer is disconnected by the hookswitch and a loop is connected across conductors T4 and R4 to operate ring relay 1270 over a path including the A. C. generator and the winding of ring relay 1270, contacts 1273, 1344, 1352, 1414, 1425, the loop to coin station CS1411 and back over contacts 1421, 1411, 1351, 1343 and 1271 to grounded (+). Upon operating, relay 1270 completes a holding circuit for itself from grounded (+) through operated contacts 1233, normally closed contacts 1311, contacts 1275, and winding 1270A to (−) battery. Contacts 1275 are "*x*" or preliminary contacts which close before contacts 1273 open. Relay 1270 also opens the ringing path at contacts 1271 and 1273 and connects incoming conductors T3 and R3 to outgoing conductors T4 and R4 through contacts 1272 and 1274.

Means is provided for signaling the operator that the call has been answered. That is, since the called party has removed his receiver or handset, the loop circuit across conductors T4 and R4 is completed to operate relay 1210 over a circuit from grounded (+) through winding 1210A, operated contacts 1272 and 1343, normally closed contacts 1351, 1411 and 1421, brush BR1411, the called party loop and back to brush BR1412, normally closed contacts 1425, 1414 and 1352, operated contacts 1344 and 1274 and through winding 1210B to (−) battery. This operation of answer bridge relay 1210 reverses the direction of current to the incoming conductors T3 and R3 at contacts 1211 and 1212 and at contacts 1213 and 1214, to energize supervisory relay 250 (Fig. 2) so that a signal may be returned to operator OP100. The operating path for relay 250 extends from grounded (+) through winding 1220A, contacts 1251, 1342, 1214, conductor R3, cable 800, brush BR712, contacts 724, conductor R1, contacts 311, 141, 214, 129C, coil RC114, contacts 129A, 246, winding 250A, contacts 244, 128, coil RC113, contacts 125, 212, conductor T1, contacts 722, brush BR711, conductor T3, cable 800, and contacts 1212 to (−) battery through winding 1220B. The direction of current flow is such that supervisory relay 250 operates to remove grounded (+) from signaling lead M at contacts 251 and to connect (−) battery through resistance lamp L310 at contacts 252 for controlling a visual indication means (not shown) at calling operator position OP100, thereby informing her that the called party has answered.

*Release*

It makes no difference which party hangs up first because operator OP100 receives a suitable supervisory signal in either case and responsive thereto she disconnects plug P101 and jack J102 to release the equipment shown. If the calling party hangs up first this signal may be extended by any suitable means (not shown) in office 10; therefore it is to be assumed that the called party hangs up first.

Following conversation, the called party restores his receiver and a signal indicative of this fact is returned to operator OP100. More specifically, the hookswitch at coin station CS1411 opens the circuit to answer bridge relay 1210 responsive to the called party replacing the receiver. Relay 1210 restores and returns the battery connections to normal at contacts 1211 and 1213. Since this again reverses the current flow to its natural direction, differentially wound supervisory relay 250 releases. Responsive thereto grounded (+) is extended to conductor M via contacts 263, 251, 334 and 318. This signals operator OP100 as an indication that the call may be taken down. To release the switch train, operator OP100 transmits a disconnect signal over conductor M1 which results in the release of signal relay 140. Contacts 143 open to restore release delay relay 210 after a brief interval of time determined by its slow release characteristics. The loop over which calling bridge relay 1220 is holding is now open at contacts 212, 213 and 141; hence relay 1220 releases.

Connector switch 1200 is restored to its normal position when relay 1220 releases. More specifically, contacts 1222 open to drop relay 1230. A circuit is now completed to release magnet M1313 from grounded (+) through normally closed contacts 1221 and 1231, operated vertical off-normal contacts VON1213, normally closed contacts 1254 and 1443, and through the winding of release magnet M1313 to (−) battery. Slow release relay 1230 restores to remove the holding ground marking at contacts 1234 thereby releasing switch-through relay 1340 which previously had been holding at contacts 1349; also contacts 1233 open to remove grounded (+) from incoming conductor S3 to restore all preceding equipment. Rotary delay relay 1330 operates and restores; however it has no function at this time.

Selector switch S700 releases responsive to the removal of grounded (+) from conductor S3. That is, switch relay 720 releases. It previously had been holding from this marking on conductor S3 via contacts 728, 726 the winding of relay 720, contacts, MS714, M715 the winding of relay 760 and contacts, M712 to (−) battery. Responsive to the closure of contacts 725 release magnet M711 operates over the path from grounded (+) on closed contacts 741 through contacts 725, MS711, to (−) battery by way of the winding of magnet M711. If relay PD710 was operated from a marking on the *x* bank, it releases now because contacts 729 open.

*Local calls*

In addition to the foregoing type of a call, it is possible for operator OP410 to initiate a local call for coin station CS1411, for example. Referring briefly to Fig. 1A, this call is that extending through outgoing trunk circuit 500, selector 30 and connector 20 to called subscriber 21. It is assumed that selector 30 is the same as that shown as S700 and connector 20 is the same as that shown as connector 1200; therefore, the call extends through selector S700, connector 1200 and on to coin station CS1411 as described above.

More particularly, outgoing trunk circuit 500 is seized from operator's position OP410 by interconnecting plug J413 and jack J414 thereby energizing sleeve relay 630 over a path extending from (−) battery through supervision lamp J412, plug J413, jack J414, and through sleeve relay winding 630A to grounded (+). The supervision lamp does not light at this time due to the resistance of winding 630A. Operation of sleeve relay 630 lights busy lamp J411 from grounded (+) through operated contacts 631, and through busy lamp J411 to (−) battery to guard visibly against seizure by another operator since each operator has a busy lamp in multiple with lamp J411. Relay 630 energizes release delay relay 640 from grounded (+) through normally closed contacts 684 and 655, and operated contacts 632 to (−) battery through the winding of relay 640. Operation of relay 640 completes a holding circuit for itself through operated contacts 644 and also energizes slow release relay 680 from grounded (+) through operated contacts 646, normally closed contacts 429 and 668 to (−) battery through the winding of relay 680. In addition, relay 640 lights supervision lamp J412 from grounded (+) through normally closed contacts 652 and 611, operated contacts 641, winding 630B, and through the jack and plug to supervision lamp J412.

A loop is now closed for operating calling bridge relay 730 in selector S700. That is, relays 640 and 680 close a loop circuit across outgoing conductors T2 and R2 to energize calling bridge relay 730 over a path which may be traced from grounded (+) through winding 730A, normally closed contacts 721 and PD711, conductors T1 and T2, repeating coil RC513, winding 610B, repeating coil RC514, normally closed contacts 654 and 663, operated contacts 642, normally closed contacts 422, operated contacts 683, conductors R2 and R1, normally closed contacts PD712 and 723, and through winding 730B to (−) battery. Relay 730 operates to prepare a circuit for directively operating selector switch S700.

It is necessary for operator OP410 to prepare outgoing trunk circuit 500 for dialing. That is, she operated dial key DL410 to connect (−) battery through resistor R410, operated contacts RS412, normally closed contacts K411 and K421, the tip conductor of plug J413 and of jack J414, repeating coil winding RC511, normally closed contacts 551, the winding of relay 530, normally closed contacts 665 and operated contacts 643 to grounded (+). Relay 530 operates to energize relay 540 from grounded (+) through operated contacts 646 and 532, and winding 540 to (−) battery. Operation of dial key DL410 also energizes line relay 510 from grounded (+) via contacts DL413 and DL415, dial pulsing contacts DL414, normally closed contacts K413 and K423, conductor R of plug J413 and jack J414, repeating coil winding RC512, normally closed contacts 555, operated contacts 543 and 533 to (−) battery through the winding of relay 410. Upon operating, pulsing relay 410 energizes relay 420 from (−) battery through the winding of relay 420, contacts 424, 413, 536, 544 and 646 to grounded (+). Relay 420 operates closing a holding circuit for itself to grounded (+) through operated contacts 425, 544 and 646. Relay 420 also transfers the holding loop circuit for calling bridge relay 730 from normally closed contacts 422 to operated contacts 423 and 411. The holding ground for slow release relay 680 is also transferred by operation of relay 520 from normally closed contacts 429 to operated contacts 429A and 414. This change at contacts 429 and 429A permits release of a dialed connection later by operation of the dial release key.

The operator may proceed to dial by means of any digit transmitting device, such as a key sender or a dial, for example. For the purpose of explaining this invention, it is assumed that a simple set of impulsing springs are used, contacts DL414, for example. In this case the operator proceeds by selectively and successively opening and closing springs DL414 in accordance with the number of the called party. Pulsing relay 410 restores once for each opening of dial pulsing contacts DL414 correspondingly to open the holding circuit for calling bridge relay 730 at contacts 411. It will be recalled that the operating circuit for pulsing relay 410 includes contacts DL413, DL415, DL414, K413, K423, 555, 543 and 533 to (−) battery through the winding of relay 410 while the operating circuit for calling bridge relay 730 includes contacts 721, PD711, repeating coil windings RC513 and RC514, contacts 654, 663, 642, 423, 411, 683, PD712 and 723. Each time that relay 410 restores, release delay relay 620 is energized from grounded (+) through operated contacts 646, 544 and 536, intermittently closed contacts 412, operated contacts 428, and through the winding of release delay relay 620 to (−) battery. Relay 620 is arranged to short-out repeating coil windings RC513 and RC514, to improve pulsing characteristics; that is, there is now a direct metallic path from conductor T2 to R2 including contacts 622. Relay 680 remains operated during pulsing due to its slow release characteristic.

Directive control of any equipment connected to the outgoing conductors T and R of this circuit is thus provided by dial and key operation by operator OP410. For example, the above described call from operator OP100 to pay station CS1411 may follow.

After completion of the dialing procedure, restoration of dial key DL410 restores relays 410, 420, 530 and 540 to their normal condition. Relay 410 is delayed in its restoration until after relay 420 releases to open the path from grounded (+) at operated contacts 646, through normally closed contacts 531 and operated contacts 421, to prevent an extra pulse resulting from opening of the holding loop on conductors T and R due to contacts 411 opening before contacts 422 reclose.

*Busy signals*

On a call from operator position OP410, two busy conditions may be encountered. One is the overflow condition where selector S700 finds no idle equipment in its search in the primary direction, this is signaled by 120 I. P. M. flash. The second is where the called line is found busy which is indicated by a 60 I. P. M. flash.

If an overflow condition is encountered, springs MS719 close thereby extending grounded (+) over contacts 753, through resistance R710, conductors HS1 and HS2, contacts 687, 429B, 515 and windings 670B and 660B to (−) battery, the path including contacts 659. Relay 670 is marginal and therefore it does not operate since resistor R710 is included in its energizing circuit; however direct ground relay 660 does operate. This connects 120 I. P. M. to signal operator OP410 via contacts 669A and 674, capacitor C610, contacts 671, 664, 654, repeating coil winding RC514 and on to the talking loop for transmitting a tone. This same 120 I. P. M. is extended over contacts 669A, 674, 669, 549 and 647 to (−) battery through the winding of relay 650. Since the 120 I. P. M. pulses are at ground potential, this source alternately operates and releases busy flash relay at 120 I. P. M. thereby opening and closing contacts 652 and 653 to flash supervision lamp J412 over the path including contacts 611 and 641, lower winding 630B, the sleeve of jack J414 and plug J413 and through lamp J412 to (−) battery. The operator observes the flashing lamp and takes down the connection.

The second busy condition is where the called line is busy. In this case, connector 1200 returns a ground marking over conductor HS3 and contact 729A. The result is exactly as explained in the next preceding paragraph except that this time both direct ground relays 660 and 670 operate. It should be noted that the absence of resistance R710 in the energizing circuit causes sufficient current flow to energize marginal relay 670. This time the interrupter connection is from 60 I. P. M. over the path including contacts 548 and 675. The 120 I. P. M. path is open at contacts 674.

The operator distinguishes between the two busy signals by the rate of flash and tone.

"Off-hook" supervision is returned when the called party answers causing answer bridge relay 1210 to operate and reverse the direction of battery flow at contacts 1211 and 1212 and at contacts 1213 and 1214 to operate supervisory relay 610. Contacts 611 open responsive thereto for breaking the path by which supervision lamp J412 is lit thus giving an "off-hook" supervision.

*On-hook supervision and release*

After conversation, either party hangs up and operator OP410 restores the connection by removing plug J413 from its connection with jack J414. Here again the operator receives a suitable supervisory signal from either the calling or the called party; however, since the calling party's equipment is not shown, it will be assumed that the called party hangs up first.

Means is provided for returning "on-hook" supervision when the called party hangs up. Answer bridge relay 1210 releases responsive to opening of the called subscriber's loop following which the direction of current flow is returned to normal at contacts 1211 and 1212 and at contacts 1213 and 1214. This restoration causes the release of supervisory relay 610 which in turn closes contacts 611 thereby completing the path which extended from grounded (+) over contacts 652, 611, 641, winding 630B, and the sleeve conductor, through lamp J412 to (−) battery. This lamp now lights as an "on-hook" supervisory signal. (It may be recalled that the circuit values are such that lamp J412 will not light when grounded (+) is extended solely through winding 630A.)

Operator OP410 observes her supervision lamp and disconnects plug J413 and jack J414 thereby releasing sleeve relay 630 which in turn opens contacts 632 to drop release delay relay 640. The loop extending from conductors T2 and R2 is now opened at contacts 642. It will be recalled that the loop formerly extended from conductor R2 through contacts 683, 422, 642, 633, 654, repeat coil winding RC514, winding 610B, repeat coil RC513, to conductor T2. Responsive thereto, calling bridge relay 1220 releases causing connector 1200 and selector S700 to release as explained above in the section headed "Release."

*Tandem call*

The selector switch, Fig. 7, may also be used on tandem calls to connect with outgoing trunk circuit 900, which leads to two interoffice conductors T5 and R5 and then to an incoming trunk circuit 1000 in another office where there is a connector switch which, for the purpose of explanation, may be connector 1200, for example. All necessary controls and supervision may be extended over these two conductors. An interoffice call of this type may be originated by operator OP100 through intertoll trunk circuit 200 or from operator OP410 using outgoing trunk circuit 500. Referring briefly to Fig. 1A, this type of call may include either distant office 10, intertoll trunk circuit 200, incoming selector S700, outgoing trunk circuit 900, incoming trunk circuit 1000 and connector 1200 or operator OP410, outgoing trunk circuit 500, selector 30, outgoing trunk circuit 900, incoming trunk circuit 1000 and connector 1200. Again it is assumed that selectors 30 and S700 are identical.

It is assumed that selector switch S700 has been directively stepped to a bank level on which an idle outgoing trunk circuit 900 is terminated. This operation has already been described above in connection with previously described calls, for example, see the section "Dialing First Digit." It will be recalled that after relay 720 operates to switch through, a loop is completed across conductors T6 and R6. This loop is effective to energize calling bridge relays 910 and 920 via the path from grounded (+) through the winding of calling bridge relay 910, repeating coil winding RC911, normally closed contacts 851, brush BR711, contacts 722, PD711, conductors T1 and T2, repeat coil windings RC513 and RC514 via winding 610B, contacts 654, 663, 642, 422, 683, conductors R2 and R1, contacts PD712, 724, brush BR712 and contacts 857 to (−) battery by way of windings RC912 and 920 to (−) battery—this, assuming that the call originated at operator position OP410. On the other hand, if the call had originated at position OP100, a similar loop could have been traced back to repeat coil RC110. This operation of relays 910 and 920 energizes release delay relay 930 from grounded (+) through operated contacts 914 and/or 924, and the winding of relay 930 to (−) battery. Furthermore, the operation of calling bridge relays 910 and 920 energizes slow release relay 840 from grounded (+) through operated contacts 914 and/or 924, normally closed contacts 814, and the winding of relay 840 to (−) battery. Relay 840 locks to a holding ground through operated contacts 931, 941 and 842 when relay 940 operates. Relay 930 operates and connects grounded (+) through operated contacts 932 to incoming conductor S6 thereby holding preceding equipment in the operated condition and guarding against the seizure of outgoing trunk circuit 900 by another call. Relay 930 also closes contacts 931 to energize slow release relay 810 over an obvious circuit to (−) battery. Contacts 814 open when relay 810 operates so that relay 840 is now dependent upon the continued operation of contacts 941. This same ground (supplied through operated contacts 931) energizes winding 960B; however, this relay does not operate at this time because of the direction of current flow in winding 960A. Winding 960A is included in the loop circuit which may be traced from grounded (+) through the winding of relay 1140, repeating coil winding RC1111, contacts 1031, 1021, K1011, conductor T5, repeating coil winding RC913, relay winding 940A, contact 951, winding 960A, contacts 912 and 922 in parallel, contacts 813 and 953, windings 940B and RC914, conductor R5, contacts K1012, 1022 and 1033 to (—) battery via windings RC1112 and 1150. Relays 940, 1140 and 1150 operate over this loop.

The two offices are now interconnected by two trunk conductors T5 and R5. Incoming trunk circuit 1000 is seized and therefore necessary operating and holding functions must follow. Operation of calling bridge relay 1140 energizes and operates release delay relay 1040 from grounded (+) through operated contacts 1143, normally closed contacts 1028, and through winding 1040 to (—) battery while calling bridge relay 1150 energizes and operates release delay relay 1120 over an obvious circuit from grounded (+) through operated contacts 1153. Relay 1120 operates and energizes winding 1030B of relay 1030 from grounded (+) through operated contacts 1121, resistor R1010, and winding 1030 to (—) battery; however, relay 1030 does not operate at this time because of the direction of the current flow in conductors T3 and R3. Another function of calling bridge relays 1140 and 1150 is the completion of a loop circuit across conductors T3 and R3 to energize calling bridge relay 1220 and thereby seize connector 1200. The energizing loop extends from grounded (+) through winding 1220A, normally closed contacts 1341 and 1211, repeating coil winding RC1113, winding 1030A, repeating coil winding RC1114, operated contacts 1141, and/or 1051 and 1151, normally closed contacts 1023 and 1213, to (—) battery through winding 1220B.

Figure 8:
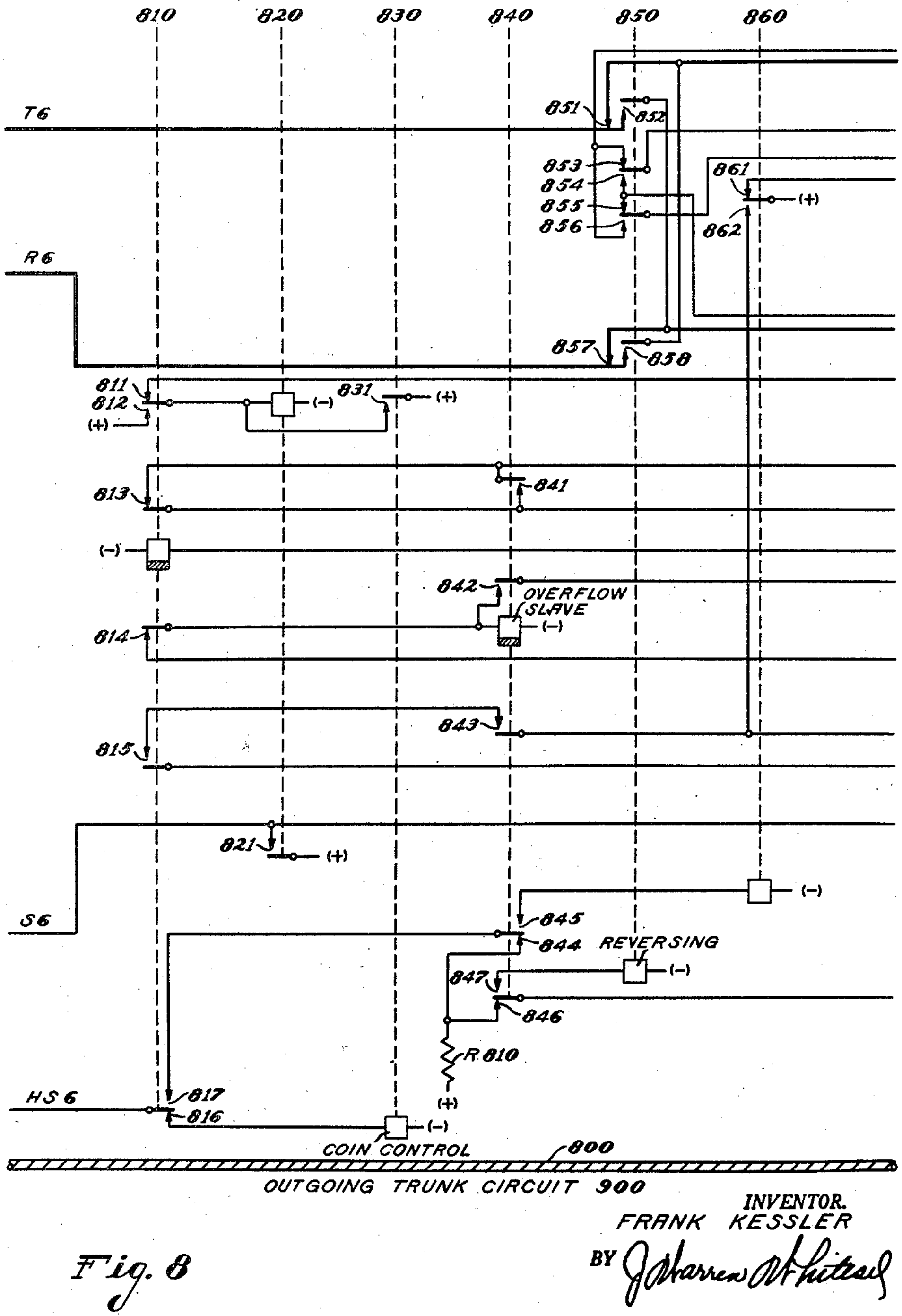
Figs. 8 and 9 show an outgoing trunk circuit for terminating a trunk leading to a distant office.

The operation of the connector switch, Figs. 12, 13 and 14, from this point has been previously described in the sections headed "Connector Operation," "Called Line Busy" and "Called Line Idle." That is, connector switch 1200 is now directively stepped by intermittent pulses extended through selector S700 to the loop holding circuit across conductors T6 and R6 which connects to Fig. 8. These pulses correspondingly operate and restore calling bridge relays 910 and 920 which in turn open pulsing contacts 912 and 922. The first restoration of relays 910 and 920 energizes slow release shunt relay 950 from grounded (+) through pulsing contacts 913 and 923, operated contacts 843 and 815, through the winding of shunt relay 950 to (—) battery. Thus, relay 950 operates and holds during each digit pulse train due to its slow release characteristics. The loop circuit across conductors T5 and R5 is now open at contacts 951 and 953 while (—) battery is connected from pulsing contacts 911 through resistor R910, normally closed contacts 853 and operated contacts 952 to conductor T5. Shunt relay 950 also connects grounded (+) normally extended through closed contacts 861, pulsing contacts 921, resistor R920, normally closed contacts 855, and operated contacts 954 to conductor R5. This arrangement improves pulsing efficiency if interoffice conductors are of excessively high resistance, since each side of the line is connected to an individual relay; whereas, according to prior practice, a single relay very often was connected to both sides of the line in series. Overflow relay 940 also operates intermittently in response to each pulse; however, it has no function at this time.

Calling bridge relay 1150 restores as ground is removed by the operation of calling bridge relay 920. This closes contacts 1152 to energize shunt relay 1050 which in turn opens the multiple pulsing circuit to calling bridge relay 1220 at contacts 1051. Relay 1050 also short circuits repeating coil windings RC1113 and RC1114 at operated contacts 1052 to improve pulsing conditions. In addition to the foregoing, shunt relay 1050 prepares a circuit through contacts 1053 so that at the first restoration of calling bridge relay 1140 responsive to a dial pulse, relay 1110 operates from grounded (+) at contacts 1142 and holds from grounded (+) through contacts 1111 as long as shunt relay 1050 is operated.

There now follows suitable digit pulses whereby relay 910 opens and closes contacts 911 to pulse relay 1140 which in turn repeats these pulses at contacts 1141 to calling bridge relay 1220 for stepping connector 1200. Relay 1050 is operated throughout pulsing during which time capacitor C1010 is charged from grounded (+) through operated contacts 1111 and 1053, normally closed contacts 1026, and capacitor C1010 to (—) battery. Relay 1050 restores at the completion of each digit pulse train whereupon capacitor C1010 discharges through the winding of relay 1110 to delay its release period—as will be explained in more detail in the section headed "Coin Control." Operation of either relay 1050 or 1110 opens conductor HS7 to prevent any possible operation of relays 1010 and 1020 while a digit pulse train is being received.

*Busy test*

Connector switch 1200 is directed from its normal position to connect with the line of coin station CS1411 at which time a test is made to determine whether that station is busy or idle. If it is idle, connector 1200 switches through while if it is busy, means is provided for returning a suitable busy signal to the calling party or operator.

If the called line is busy when reached by connector 1200, a grounded (+) marking is connected to conductor HS7 from contacts 1325 responsive to the operation of busy relay 1320 as explained above in the section entitled "Called Line Busy." This marking is extended over normally closed contacts 1215, conductors HS3 and HS7 through operated contacts 1124, normally closed contacts 1112 and 1054, and through windings 1020B and 1010B to (—) battery. Both direct ground relays 1010 and 1020 operate since this path does not include a resistor limiting the current beyond the non-operate point of marginal relay 1010B. Relay 1010 locks to grounded (+) through operated contacts 1045 and "*x*" or preliminary contacts 1014 while relay 1020 operates after a brief interval determined by its slow characteristics, and locks to grounded (+) through contacts 1121 and also contacts 1013, resistor R1010 and contacts 1029. Relay 1010 closes contacts 1011 and 1012 to retain the holding loop for calling bridge relays 1140 and 1150 when relay 1020 operates.

Means is provided for releasing equipment and returning a busy signal. More specifically, contacts 1011 and 1012 close and simultaneously therewith contacts 1013 close. It may be recalled that the lower winding of relay 1030 was previously biased over the path from grounded (+) through contacts 1121, resistor R1010 and winding 1030B. The value of resistor R1010 is such that relay 1030 does not operate; however, after relay 1010 operates, contacts 1013 close a direct path to grounded (+) and the current is now high enough to operate relay 1030. Therefore, the direction of current flow is such that supervisory relay 960 operates and connects grounded (+) at contacts 961 to reversing relay 850 via contacts 847. The current flow over conductors T6 and R6 is now reversed to operate relay 250; however this has no effect at this time. Overflow relay 940 opens contacts 941 thereby releasing overflow slave 840 which had been holding by way of contacts 842. Contacts 844 are now closed so that a direct ground is returned via contacts 961, 846, 844, 817, conductor HS6 and brush BR714 to signal the operator. If the call was from operator OP100, a busy signal is returned to her via intertoll trunk circuit 200. From this point the circuit functions as described above in the section entitled "Called Line Busy." On the other hand, if the call originated through operator position OP410, the direct ground marking on contacts 961 is extended over conductors HS6, HS1 and HS2 to outgoing trunk circuit 500 where the operation explained above in the section "Busy Signals" results. After a brief interval of time marked by its slow operate characteristic, relay 1020 operates to break the succeeding loop at contacts 1023. Calling bridge relay 1220 drops responsive to the opening of contacts 1023 thereby releasing connector 1200.

Figure 9:
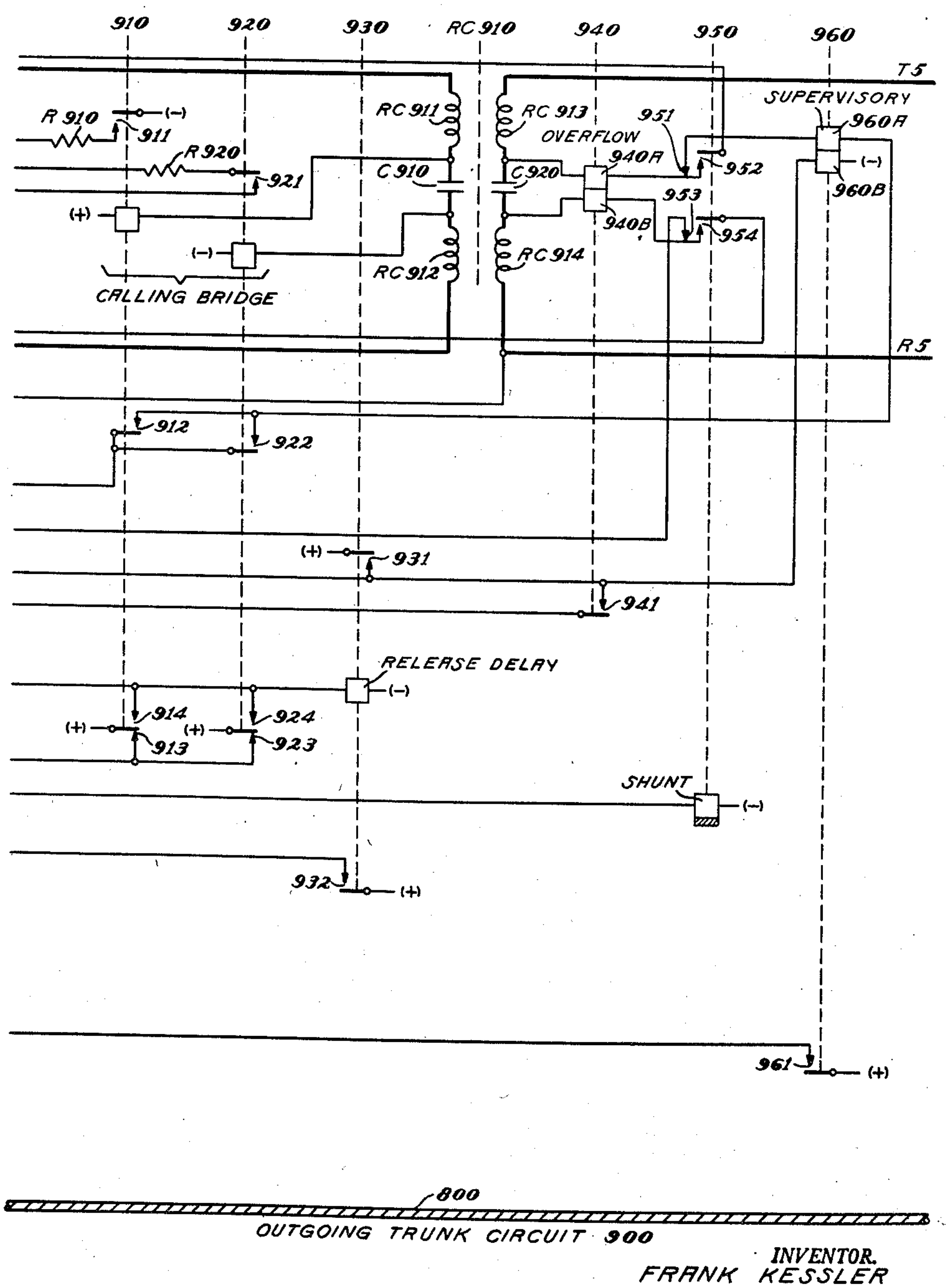
Figure 10:
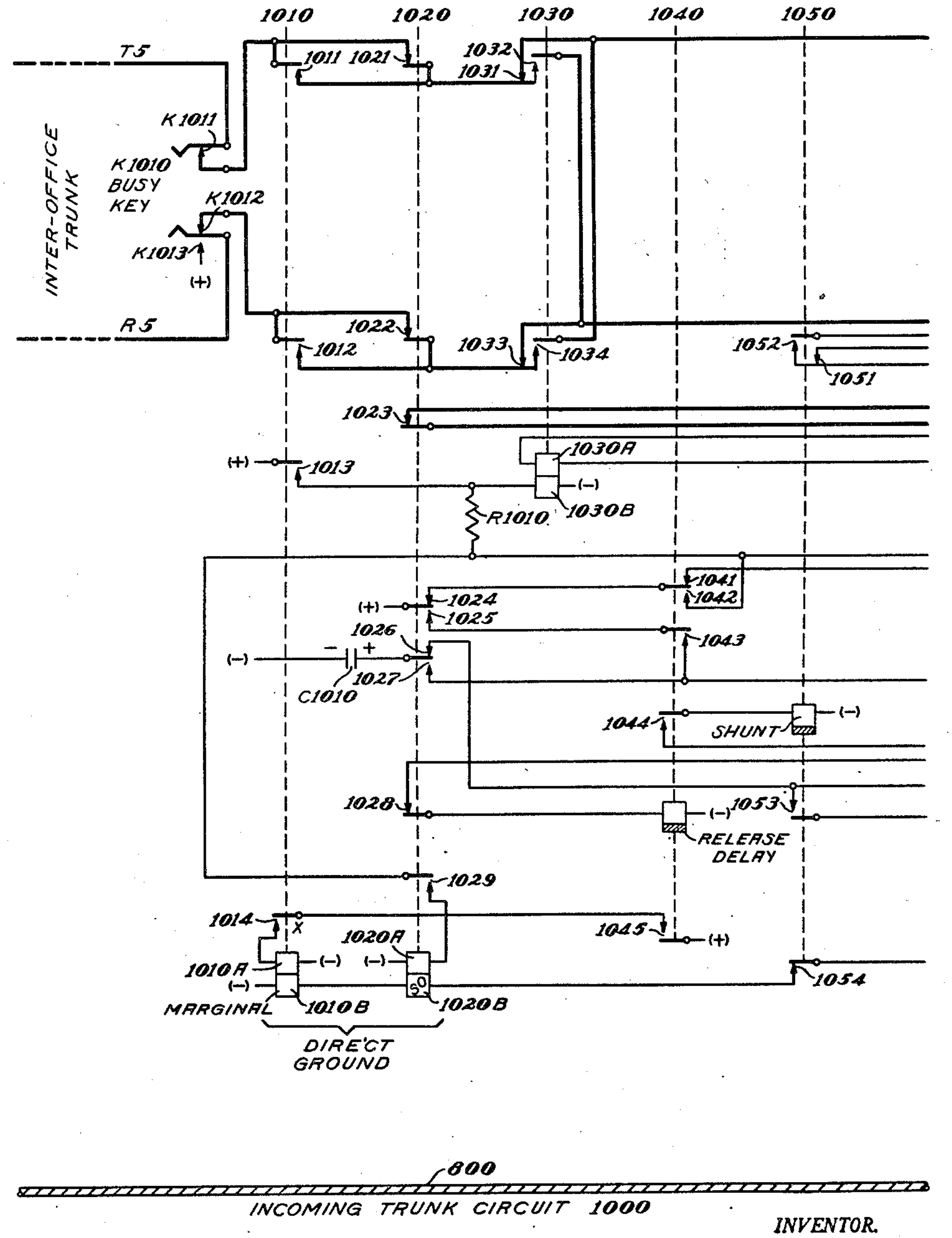
Figs. 10 and 11 show an incoming trunk circuit for terminating a trunk from a distant office.
Figure 11:
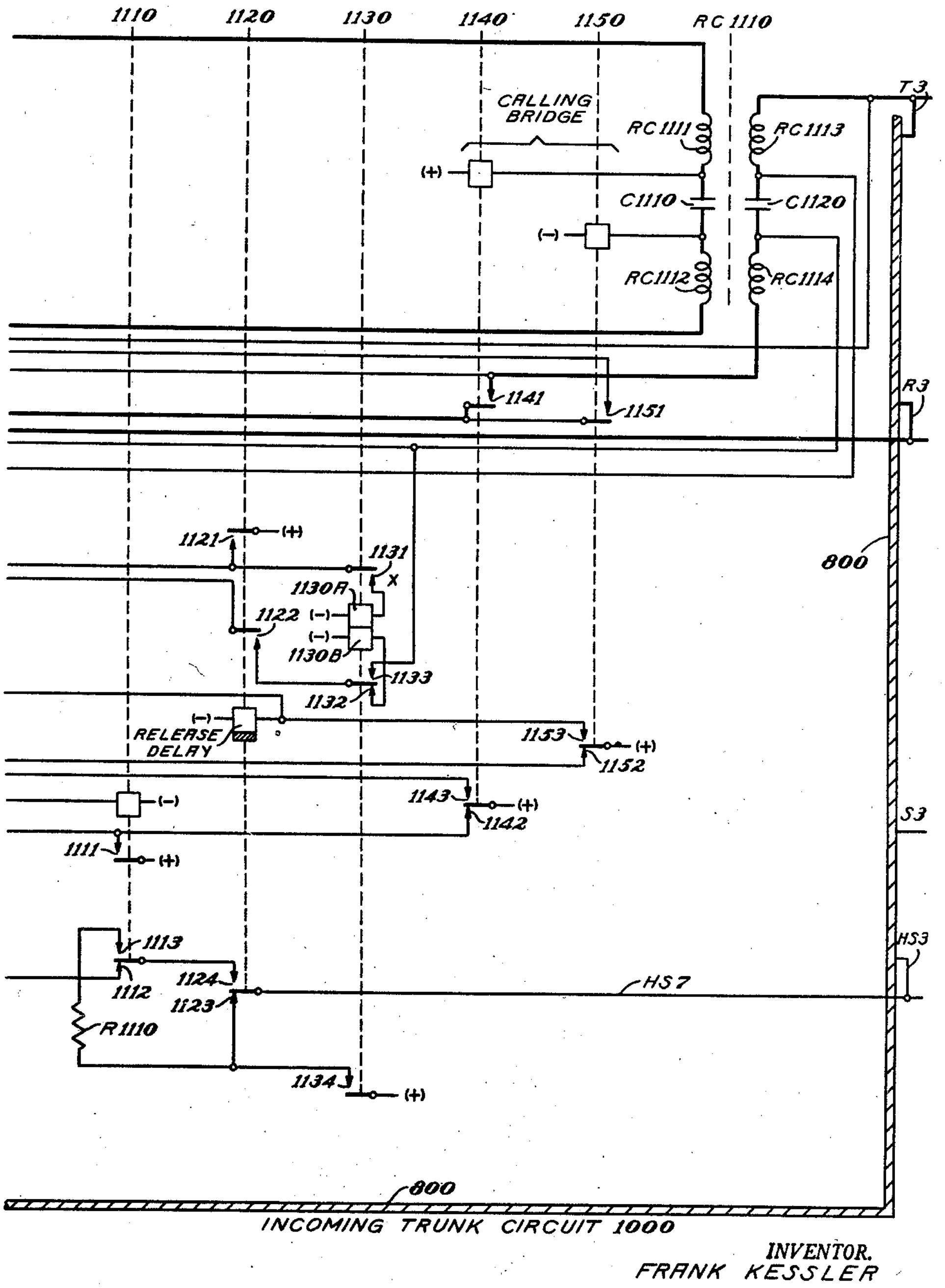

Upon noting the busy flash, the operator restores the equipment as explained in the section on "Release." The outgoing trunk circuit of Figs. 8 and 9 is released as explained below in the section entitled "Supervision and Restoration."

For testing purposes, a busy condition may be simulated by operation of busy key K1010 which opens incoming conductors T5 and R5 at contacts K1011 and K1012. Grounded (+) is connected through contacts K1013 to conductor R5 and through normally closed contacts 811 and the winding of relay 820 to (−) battery. Relay 820 operates and connects grounded (+) through operated contacts 821 to guard the outgoing trunk circuit 900 against seizure by another incoming call.

*Idle line*

For the sake of argument, it may be assumed that coin station CS1411 is idle when connected by coin control connector 1200. In this case, it is necessary to return a suitable signal for giving off-hook supervision. In more detail, when the called party at telephone CS1411 removes his receiver or handset to answer a call, answer bridge relay 1210 operates to reverse current flow to reversing relay 1030. It operates to reverse the direction of current flow through contacts 1031 and 1032 and contacts 1033 and 1034, to relay 960 which operates to energize reversing relay 850 from grounded (+) through operated contacts 961 and 847 and the winding of relay 850 to (−) battery. It might be noted that this time overflow relay 940 remains operated. Operation of relay 850 reverses the direction of current flow over conductors T6 and R6 to supervisory relay 250 in intertoll trunk circuit 200 or to supervisory relay 610 in outgoing trunk circuit 500 to provide an answer or "off-hook" supervision indication to the calling operator.

*Supervision and restoration*

The called subscriber finishes his conversation and replaces his receiver responsive to which answer bridge relay 1210 releases to return the direction of battery current flow to normal thereby releasing reversing relay 1030 which in turn returns the direction of current flow over conductors T6 and R6 to normal, similarly to the operation explained above in the section entitled "Busy Test," thereby signaling the operator.

The operator initiating the call observes the on-hook signal and proceeds to restore equipment after her normal procedure such as was described above in the sections entitled "Release" and "On-Hook Supervision and Release." The loop across conductors T6 and R6 is broken by this operator action; hence calling bridge relays 910 and 920 release. Contacts 914 and 924 open to release all relays in outgoing trunk circuit 900 and in preceding equipment such as selector S700, for example. That is, release delay relay 930 releases to open contacts 931 thereby restoring relays 810, 820, 840 and 850. Contacts 932 release preceding equipment. Contacts 912 and 922 open to break the loop to incoming trunk circuit 1000 thereby releasing relays 940 and 960 and calling bridge relays 1140 and 1150. Responsive thereto, contacts 1141 and 1151 open to release connector calling bridge relay 1220 and hence connector 1200. Release delay relay 1120 falls when contacts 1153 open and release delay relay 1040 releases responsive to the opening of contacts 1143.

*All trunk busy*

Figure 16:
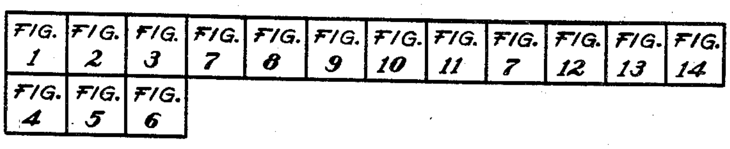
Fig. 16 shows an optional arrangement for tandem calls wherein a duplicate of Fig. 7 may be inserted between Figs. 11 and 12.

Sometimes incoming trunk circuit 1000 is arranged to connect to an incoming selector instead of a connector. In this case, it may be assumed that conductors T3, R3 and HS3 at the right of Fig. 11 connect to conductors T1, R1 and HS1 shown at the left of Fig. 7. It would not be necessary to connect anything to conductor S1 in this example. The selector of Fig. 7 may then have access to connector 1200, the layout being that shown in Fig. 16. Or, referring briefly to Fig. 1A, this call may include outgoing trunk circuit 900, incoming trunk circuit 1000, incoming selector 80, connector 90 and subscriber 91, it being assumed that selectors S700 and 80 and that connectors 1200 and 90 are identical. The various circuits function as described in the calls which are explained above. Sometimes selector 80 hunts out to its overflow position without finding any idle trunks (for an explanation of this, see the section above entitled "Overflow"). In this case it is necessary to return a suitable signal to the calling operator.

The equipment is released upon encountering an all trunk busy condition. It will be recalled that overflow springs MS719 operate in case an all trunks busy condition is encountered; hence a path from grounded (+) is closed via contacts MS719, 753, and resistor R710 to conductors HS1 and HS7, contacts 1124, 1112 and 1054 to (−) battery through windings 1020B and 1010B. Marginal relay 1010 will not operate this time since resistor R710 limits the current flow to a point below the operating characteristics of relay 1010. However, relay 1020 does operate to open the holding circuit for relay 940 at contacts 1021 and 1022. Also, these contacts break the loop to calling bridge relays 1140 and 1150 while contacts 1023 open the succeeding loop to drop connector 1200. Operation of relay 1020 also restores relays 1040 and 1050, while release of relay 1150 opens contacts 1153 to restore relay 1120; however, it is held operated for the brief interval while capacitor C1010 is discharging over the path including contacts 1027. Thus, relay 1020 is held operated until grounded (+) is removed at open contacts 1121 so that preceding equipment has sufficient time to function properly. (Capacitor C1010 was previously charged from grounded (+) through operated contacts 1025, 1043 and 1027 after relay 1020 operated and before release delay relay 1040 restores, this charging path being closed during the slow release interval of relay 1040.)

A supervisory signal is returned when overflow relay 940 restores responsive to opening the loop at contacts 1021 and 1022. Contacts 941 open to restore slow release relay 840 previously holding via contacts 842. This connects grounded (+) through resistor R810, normally closed contacts 844 and operated contacts 817 to conductor HS6, brush BR714, contacts 729A, to cause intertoll trunk circuit 200 to function as described previously in the section entitled "Overflow." All of the equipment in outgoing trunk circuit 900 is restored when the holding loop across incoming conductors T6 and R6 is opened.

*Ouogting call from operator OP314 over toll line TL103*

Intertoll trunk circuit 200 is adapted for outgoing calls destined for operator OP100 as well as for the incoming call explained above. To illustrate such a call, it is assumed that operator OP314 calls operator OP100 over plug CD311 to extend a call which was received in any suitable manner over plug CD313. It is assumed that the equipment leading to plug CD313, cord circuit CD312 and operator circuit OP314 are all conventional equipment.

To extend this call, operator OP314 interconnects plug CD311 and jack J310. Responsive thereto (—) battery is connected from cord circuit CD312 through conductor J313, and winding 340A to grounded (+). Sleeve relay 340 operates to light busy lamp L320 from grounded (+) through contacts 341, and lamp L320 to (—) battery, to guard this circuit against seizure by another operator. Relay 340 also connects grounded (+) through contacts 343 to conductor S to guard this circuit against seizure by an incoming call from selector S700. In addition to the foregoing, relay 340 energizes sleeve slave relay 120 from grounded (+) through normally closed contacts 247 and 323, operated contacts 342, through the winding of relay 120 to (—) battery. Upon operating, relay 120 locks through contacts 129E and 342. At contacts 122, relay 120 also opens the circuit extending ground to winding 260A. However, pulsing relay 260 operates from grounded (+) through operated contacts 129E and 342, resistor R130, normally closed contacts 131, operated contacts 123, through winding 260A, normally closed contacts 243, operated contacts 129, normally closed contacts 245, and winding 260B to (—) battery. Relay 260 operates and energizes release delay relay 270 from grounded (+) through contacts 262, and the winding of relay 270 to (—) battery.

A circuit is now closed for seizing equipment in the distant office over toll line TL103. This signal may light a lamp at operator's board OP100 responsive to which she interconnects a suitable plug and jack; or this signal may seize an incoming selector over conductors S100, in which case dial pulses are necessary to set telephone equipment at the distant office. For the purpose of explaining this invention, it is assumed that an incoming selector is seized.

The seizure signal results from operation of pulsing relay 260 which removes the ground marking from the M lead at contacts 263. A circuit is then closed to connect (—) battery through resistance lamp L310, operated contacts 264, normally closed contacts 251 and 317 to the M lead. This marking operates equipment at the distant end. Also, the marking is used for subsequent pulsing and supervisory functions. Release delay relay 270 energizes direct ground relay 320 over the path from grounded (+) through operated contacts 272, and winding 320A to (—) battery. Relay 320 operates to connect a multiple ground through contacts 321 to busy lamp L320. Relay 320 also connects grounded (+) from normally closed contacts 221, through operated contacts 322 and 121 to low resistance winding 340B, and conductor J313. The resistance of winding 340B is such that a supervisory lamp (not shown) lights in cord circuit CD312, which indicates to operator OP314 that she may transmit digit pulses indicative of the called number. Release delay relay 270 prepares a circuit, through contacts 276, to operate signal relay 220 responsive to grounded (+) markings on the E conductor as they may occur throughout the call.

To prepare for dialing, operator OP314 connects (—) battery to the tip conductor of plug CD311 and jack J310, through operated contacts 126, repeating coil winding RC113, operated contacts 127, winding 130A and grounded (+) through operated contacts 124. Off-normal relay 130 operates over this path and in turn relay 130 closes a circuit to relay 360 extending from grounded (+) (not shown) applied from cord circuit CD312 by operator OP314 to the ring conductor of plug CD311 and then through contacts 129D, winding RC114, contacts 129B, 134, 352, 361 and winding 360A to (—) battery. Relay 360 locks through "x" or preliminary operated contacts 363. The circuit to winding 350A is opened at contacts 362. When relay 130 operates it opens the path from grounded (+) through operated contacts 129E operated contacts 342, resistor R130, contacts 131, 123, winding 260A, contacts 243, 129 and 245 to (—) battery through winding 260B and grounded (+) from the pulsing source at operator OP314, connected over the ring conductor of plug CD311 and jack J310, is substituted therefore by way of contacts 129D, repeating coil winding RC114, operated contacts 129B, 134, 132, 123, through winding 260A, contacts 243, 129 and 245 to (—) battery through winding 260B.

Toll line TL103 is opened during pulsing. Relay 260 is now adapted to respond to digit pulses successively dialed by operator CD314. These digits will be repeated over the M lead by an intermittent opening and closing of pulsing contacts 264 to break the path extending from (—) battery applied through resistance lamp L310 and contacts 264, 251 and 317. As pulsing relay 260 restores responsive to each digit pulse, shunt relay 110 is operated from grounded (+) through contacts 261 and 273, to (—) battery. When shunt relay 110 operates, it opens contacts 112 and 113 thereby breaking toll line TL103 during pulsing. The equipment through which toll line TL103 is connected might become noisy if it were allowed to remain open; therefore it is terminated by its characteristic impedance by off-normal relay 130, the termination being by way of resistor R110, and contacts 135.

Pulse compensation is provided while toll line TL103 is open. That is, pulsing relay 260 is connected to a source of dial pulses by way of the secondary winding of repeat coil RC110. If the primary winding of this coil were permitted to remain open, the characteristics of pulsing relay 260 would be changed and non-standard pulse ratios would result. To prevent this, shunt relay 110 closes contacts 114 to connect terminating resistance R120 across secondary windings RC111 and RC112, thus returning the circuit of relay 260 to its normal condition. Following the last pulse in each digit pulse train, contacts 261 remain open and shunt relay 110 drops to return trunk TL103 to its normal condition.

Off-normal relay 130 releases after completion of the dialing procedure to restore the original holding circuit for pulsing relay 260. It will be recalled that off-normal relay 130 operated from (—) battery applied to the tip of plug CD311 by operator OP314. She removes this (—) battery at the end of dialing to break the path which formerly extended from that battery over contacts 126, repeat coil winding RC113, contacts 127 and winding 130A, to grounded (+) at contacts 124. Pulsing relay 260 now holds from (—) battery through winding 260B, contacts 245, 129, and 243, winding 260A, contacts 123, 131, resistor R130 to grounded (+) through contacts 342 and 129E.

If the incoming selector at distant office 10 (not shown) is directively stepped to a level on which no idle trunk circuit is available, or stated otherwise, if overflow is encountered, ground interrupted at the rate of 120 times per minute is connected to conductor E1 over dial leg DL110 and through operated contacts 276, to operate signal relay 220 at the rate of 120 I. P. M. This alternately lights and extinguishes a supervisory lamp (not shown) in cord circuit CD312. That is, contacts 221 open and close a path extending from grounded (+) through contacts 221, 322 and 121, low resistance winding 340B, the sleeve of jack J310 and plug CD311, to a lamp (not shown) which will burn when in series with winding 340B but not when in series with winding 340A. It might be well to point out that contacts 322 closed when relay 320 operated. This was when pulsing relay 260 closed contacts 262 to pull release delay relay 270 which in turn closed contacts 272 to operate relay 320 over an obvious circuit.

When the called line is busy, a signal is returned in the form of an audilbe tone and ground pulses recurring at the rate of 60 times per minute. This alternately lights and extinguishes the supervisory lamp in the cord circuit in the manner explained in the immediately preceding paragraph except at half the rate, i. e., 60 I. P. M.

If the called line is not in use when seized, the called party hears a suitable signal responsive to which he removes his receiver to operate relay 220 from ground on conductor E and the supervisory lamp in cord circuit CD312 is extinguished accordingly. It is relighted when the receiver is replaced by the called party after completion of the conversation.

Upon receiving a supervisory signal at the end of the conversation, operator OP314 takes-down the call by disconnecting plug CD311 and jack J310. This causes sleeve relay 340 to release and, in turn, sleeve slave relay 120 to release. All remaining relays which were operated release at this time. For example, pulsing relay 260 releases when contacts 342 open and contacts 262 open to release relay 270. Contacts 272 are now open and so relay 320 drops.

*False pulse*

Means is provided for reducing to a minimum the number of false pulses which may be transmitted. It may be recalled that digit and supervisory pulses are transmitted from intertoll trunk 200 to the distant office over conductor M by operation of contacts 263 and 264; therefore, it is necessary to prevent false operation of pulsing relay 260 to avoid false pulsing on outgoing calls. Since the operating path of pulsing relay 260 extends over two contacts (123 and 129A) on sleeve slave relay 120, it is seen that only this slave relay need be controlled to avoid all such spurious pulsing. For example, if plug CD311 is quickly reinserted after having once been removed, relay 120 does not immediately reoperate since release delay relay 270 and direct ground relay 320 must fully restore before sleeve slave relay 120 can reoperate over the path extending from grounded (+) through contacts 323, i. e., from contacts 129E through contacts 323 and 342 to (—) battery through relay 120. This precautionary feature is provided to prevent a momentary restoration of pulsing relay 260 and a resultant false pulse. If plug CD311 originally is inserted in such a manner that conductor J313 is momentarily opened to restore sleeve relay 340, sleeve slave relay 120 will not restore—provided the momentary restoration of relay 340 is not of greater time duration than the slow release characteristic of relay 120—again avoiding a false pulse. However, if relay 120 does release, responsive to the momentary restoration of relay 340, relay 120 will not reoperate until after relays 270 and 320 fully restore.

*Outgoing call from operator OP410 over toll line TL103*

If the operator OP410 wishes to call subscriber A in distant office 10, the procedure described above in the section headed "Local Call" is followed, except that the number which is dialed causes selector S700 to seize cable 700, leading to Fig. 2 and intertoll trunk circuit 200. Following this, operator OP410 continues to dial and intertoll trunk circuit 200 functions to repeat the digit signals over conductor M and dial leg DL110 to set the telephone equipment at the distant office.

More specifically, selector S700 operates brushes BR710 to seize the T, R and S conductors leading to Fig. 2 via cable 700. A holding loop is now completed across conductors T and R to energize pulsing relay 260 from grounded (+) through normally closed contacts 122, winding 260A, normally closed contacts 243 and 128, repeating coil winding RC113, normally closed contacts 125, 211 and 222, to conductor T and the holding loop across conductors T and R, and back on conductor R over normally closed contacts 224, 213 and 129C, repeating coil winding RC114, normally closed contacts 129A and 245, and through winding 260B to (—) battery. Operation of pulsing relay 260 energizes release delay relay 270 and direct ground relay 320, as previously described in the section headed "Outgoing Call from Operator OP314." The pulsing is by way of intermittent opening of conductors T and R. Since pulsing relay 260 is held over this loop, it repeats each pulse at contacts 263 and 264.

Throughout the call it is necessary to return certain supervisory signals from office 10 which will be by way of conductor E, over which signal relay 220 operates. Each time that signal relay 220 operates for supervision, it reverses the direction of current flow in conductors T and R at contacts 222 and 223 and at contacts 224 and 225, to operate correspondingly the supervisory relays in preceding circuits. After operating, relay 220 momentarily energizes relay 230 from grounded (+) through "x" or preliminary operated contacts 227, normally closed contacts 228, and the winding of shunt relay 230 to (—) battery. A connection is also completed to charge electrolytic capacitor C210. Shortly thereafter, contacts 228 open; however, relay 230 is held operated due to the effect of the electrolytic capacitor C210 discharging through contacts 249, 332 and 327 to (—) battery through the winding of shunt relay 230. This discharging current has a slow releasing effect on relay 230 sufficient to hold it operated while signal relay 220 responds to 120 or 60 ground pulses per minute, as the case may be, which is returned from the distant end over conductor E. This is so that resistor R110 may be continuously connected across conductors T and R of the toll line at contacts 232 to avoid any unbalancing effect on toll line amplifying apparatus responsive to the intermittent removal of resistor R110 by contacts 226.

*Ring control*

Usually coin control connector 1200 transmits a ringing signal automatically according to the procedure outlined above under the heading "Called Line Idle"; however, it is possible for the operator to hold off ringing until a later time, as she may wish. For the purpose of explaining this feature, let it be assumed that the call originated at operator position OP410.

While the first digit is being dialed into connector switch 1200, ring control relay 1270 is energized from grounded (+) through resistor R440, operated contacts 429C and 687, over conductors HS2, HS1, operated contact 729A, brush BR714, conductor HS3, cable 800, normally closed contacts 1215, operated contacts 1263, and through winding 1270A to (—) battery. Relay 1270 operates and locks through its "x" or preliminarily operated contacts 1275. A. C. generator is disconnected from the called line at contacts 1271 and 1273. Operation of relay 1270 energizes ring slave relays 1240 and 1250 from grounded (+) through normally closed contacts 1349A, operated contacts 1276, and relay windings 1250B and 1240B to (—) battery. Upon operating, slow release relay 1250 locks from grounded (+) through operated contacts 1234, normally closed contacts 1444, operated contacts 1257, and through upper winding 1250A, to (—) battery. This operation of relay 1250 also transfers incoming conductor T3 from the upper winding 1220A of calling bridge relay 1220 to upper winding 1240A through the combined action of operated contacts 1252 and released contacts 1251. Relay 1240 opens normally closed contacts 1241 so that relay 1420 will not operate.

To start ringing, operator OP410 actuates ring start key RS410 to control outgoing trunk circuit 500 which places a direct ground marking on the HS conductor. In greater detail, ring start relay 530 operates from (—) battery through resistor R410, operated contacts RS412, normally closed contacts K411 and K421, the tip of plug J413, through repeating coil winding RC511, normally closed contacts 551, the winding of ring start relay 530, normally closed contacts 665, and operated contacts 643 to grounded (+). Relay 530 locks from the same ground through operated contacts 535. Operation of relay 530 also energizes relay 540 via contacts 532 and 646, as busy flash relay 650 operates over the path from (—) battery, through relay 650, contacts 427, 412, 536, 544 and 646 to grounded (+). Line relay 510 operates from grounded (+) through operated contacts 644, 656, 623 and 537, and through winding 510B to (−) battery. Relay 510 locks through operated contacts 513 to the same grounded (+), i. e., via contacts 537, 623, 656 and 644. A direct ground marking is now connected to conductor HS2 for operating relay 1310. This path may be traced from grounded (+) through operated contacts 514, normally closed contacts 429B, contacts 687, conductors HS2 and HS1, contacts 729A, brush BR714, conductor HS3, cable 800, normal contacts 1215, operated contacts 1349C, and the winding of relay 1310 to (−) battery. Operation of relay 1310 opens the holding circuit for ring relay 1270 at contacts 1311. Relay 1270 restores to connect ringing current to the called line over the path from A. C. generator, through winding 1270B, contacts 1273, 1344, 1352, 1414, 1425, brush BR1412, the loop to station CS1411, and back over brush BR1411 and contacts 1421, 1411, 1351, 1343 and 1271 to grounded (+). From this point the circuit functions as explained above under the heading "Called Line Idle."

*Operator recall*

Occasionally it is necessary to recall an operator. For example, in a tandem call and also in calls either from operator OP314 or from operator OP410 to operator OP100, a recall signal may be required to summons the calling operator. To facilitate explanation, it is assumed that operator OP410 is recalling operator OP100 via intertoll trunk circuit 200.

To recall, ring start key RS410 is operated and the circuit functions as described in the section headed "Ring Control." The holding loop is now opened for a period equal to a single pulse; this is the accepted procedure for recall of a toll operator. Operation of relay 650 opens the holding loop across conductors T2 and R2 at contacts 654, and also energizes relay 660 from grounded (+) through operated contacts 646, 532 and 659A, and winding 660B to (−) battery. Relay 660 operates and energizes relay 620 from grounded (+) through operated contacts 646 and 544, normally closed contacts 512, operated contacts 667, and the winding of relay 620 to (−) battery. Operation of relay 620 recloses the loop holding circuit across outgoing conductors T2 and R2 which was previously opened at contacts 654; hence, it is seen that the loop is opened for one dial pulse period which is transmitted to operator OP100 as in the case of any dial pulse (see section on "Outgoing Call From Operator OP410 Over Toll Line TL103"). This pulse may operate conventional equipment at the distant end. Relays 510, 530, 540, 650, 660 and 620 restore to their normal condition after ring start key RS410 is restored by operator OP410.

If operator CD314 desires to recall on a call to operator OP100, the ringing key in cord circuit CD312 is operated to connect battery to the tip conductor via plug CD311 and jack J310 to operate off-normal relay 130. Operation of relay 130 opens the holding ground for pulsing relay 260 at contacts 131. Relay 260 releases and transfers the M lead at contacts 264 to resistance battery thereby signaling the distant operator OP100. Pulsing relay 260 also closes contacts 261 for operating shunt relay 110 over the path from (−) battery, through the winding of relay 110, to grounded (+) via contacts 273 and 261. Contacts 262 open; however, release delay relay 270 does not release at this time due to its slow release characteristics. Shunt relay 110 operates a second shunt relay 230 via contacts 116. At contacts 115, a circuit is closed for relay 350 from grounded (+) over contacts 312, over operated contacts 115 and 136, normal contacts 362 to (−) battery through winding 350A. Relay 350A is slow to operate and therefore after a brief interval it closes contacts 353 for reoperating pulsing relay 260 over the path from grounded (+) and contacts 353, 132 and 123, the upper winding of relay 260, contacts 243, 129 and 245 to (−) battery through winding 260B. The time required for this relay operation is such that one pulse is sent over the M lead at contact 264. Operation of relay 350 also closes grounded (+) at contacts 351 to light a supervisory lamp (not shown) in cord circuit CD312 to indicate transmission of a recall signal. Restoration of ringing key by operator CD314 restores 130 and 350 to release the normal holding circuit for relay 260.

*Coin control on local calls*

Coin collection and refund control by operator OP410 on a call from outgoing trunk circuit 500 through selector switch S700 and a connector switch 1200 to coin telephone CS1411 will now be described.

It is assumed that coin telephone CS1411 has been called, the called party has answered and deposited coins in the coin box. Following this, operator OP410 may wish to collect the deposited coins while the called party is still listening. If so, an operation of coin collect key K410 energizes relay 550 over the path from (−) battery through resistor R410, operated contacts K414, K423, the ring conductor of plug J413 and of jack J414, through repeating coil winding RC512, normally closed contacts 555, 542 and 661, and the winding of relay 550 to grounded (+). Upon operating relay 550 locks through operated contacts 554 and connects grounded (+) through operated contacts 553 and windings 520B and 510B to (−) battery. Relays 510 and 520 do not operate over this connection due to the circuit's characteristics; however, operation of coin collect key K410 also energizes relay 510 from positive 110 volt direct current collect battery through resistor R420, operated contacts K412, normally closed contacts K421, and the tip conductor of plug J413 and jack J414, through repeating coil winding RC511, operated contacts 552 and 613, and through windings 520A and 510A to (−) battery. Due to the direction of the current flow from the 110 volt source, only relay 510 operates to connect grounded (+) through contacts 514, normally closed contacts 429B, and over the previously described path via conductor HS2, through operated contacts 1258, and through coil winding of coin control relay 1410 to (−) battery.

Coin control connector 1200 now functions to collect the coins deposited at station CS1411. That is, the operation of relay 1410 opens conductor T4 at contacts 1411, and conductor R4 at contacts 1414, and connects conductors T4 and R4 together at operated contacts 1412 and 1415. A circuit is now completed from 110 volt collect battery through normally closed contacts 1413, operated contacts 1423 and 1412 and 1415 in parallel over conductors T4 and R4 to coin station CS1411. This coin collect battery causes the coin mechanism (not shown) at station CS1411 to collect the previously deposited coins.

For coin refund, operator OP410 operates coin refund key K420 which connects battery through resistor R410 and operated contacts K424 to energize relay 510, 520 and 550 as previously described for coin collect. However, this time relay 520 operates from the negative refund coin battery, instead of relay 510 which operated in the case of coin collect. Relay 520 connects grounded (+) through operated contacts 521 to the loop holding circuit for holding relays 1220 and 1240 in an operated conditions. The circuit characteristics are such that relay 1220 holds; however relay 1240 restores to energize coin control relay 1420 from grounded (−) through operated contacts 1222, normally closed contacts 1241, operated contacts 1253, and the winding of relay 1420 to (−) battery. Operation of relay 1420 opens conductor T4 at contacts 1421 and opens conductor R4 at contacts 1425. Conductors T4 and R4 are connected together through operated contacts 1422, 1426 and 1424 to negative coin refund battery which is connected through conductors T4 and R4, to coin telephone CS1411 thereby causing the coin mechanism (not shown) to refund the previously deposited coins.

Operation of either collect relay 1410 or refund relay 1420 energizes slow release relay 1350 over an obvious circuit from grounded (+) through operated contacts 1417 or 1428. Relay 1350 opens conductor T4 at contacts 1351 and conductor R4 at contacts 1352, and connects conductors T4 and R4 together at contacts 1353. A circuit is now completed from grounded (+) through normally closed contacts 1441, to "x" or preliminarily operated contacts 1354, and through capacitor C1310 and resistor R1310 to conductors T4 and R4; thus, while coin battery is connected to the talking path, means is provided to eliminate sparks and minimize acoustic clicks which may be heard by the called party during coin control. Relay 1350 also holds answer bridge relay 1210 in an operated position over the circuit from grounded (+) through normally closed contacts 1441, "x" or preliminarily operated contacts 1354, resistor R1320, operated contacts 1344 and 1274, and winding 1210B to (−) battery.

Restoration of either of the coin control keys K410 or K420 restores relay 550 and all other equipment used for the coin control function.

*Toll call marking*

Means is also provided for extending coin and ring control on toll calls through outgoing trunk circuit 900 and incoming trunk circuit 1000. In this case, the operator initiates the coin control operation, as explained above. However, it may be well to recall briefly certain previous circuit operations which took place when outgoing trunk circuit 900 was seized. Relay 420 is held operated during the dialing procedure, and therefore, ground is connected through resistor R440, operated contacts 429C and 687, conductors HS2 and HS1, contacts 729A, brush BR714, conductor HS6, normally closed contacts 816, and the winding of coin control relay 830 to (−) battery. Relay 830 operates and energizes relay 820 from grounded (+) through operated contacts 831, and through the winding of relay 820 to (−) battery. Grounded (+) on contact 831 is extended to operate calling bridge relay 1150 over the circuit through normally closed contacts 811, K1012, 1022 and 1033, repeating coil winding RC1112, and the winding of relay 1150 to (−) battery. This operation of relay 1150 energizes release delay relay 1120 from contacts 1153 which in turn energizes relay 1130 from grounded (+) through normally closed contacts 1024 and 1041, operated contacts 1122, normally closed contacts 1132, and through winding 1130B to (−) battery. Upon operating, relay 1130 locks to grounded (+) through operated contacts 1121, and "x" or preliminarily operated contacts 1131, to (−) battery through winding 1130A. Release delay relay 930 requires a brief interval to operate. After this interval, the ground for relay 1130 is removed. That is, contacts 931 close responsive to which relay 810 operates and opens contacts 811 thereby breaking the path over which relay 1150 operated. Therefore a momentary marking pulse has been transmitted to identify the call as one from an outgoing trunk, requiring subsequent ringing and coin control. Relay 1130 remains locked in an operated position.

The call progresses, as explained above, and during the process, calling bridge relays 1140 and 1150 reoperate and relay 1110 operates while relay 1130 remains locked. During the dialing of each digit, operated relays 1110, 1120 and 1130 connect grounded (+) through operated contacts 1134, resistor R1110, operated contacts 1113 and 1124, to outgoing conductors HS7 and HS3 to operate ring relay 1270 via contacts 1215 and 1263. Relay 1270 operates and locks to grounded (+) through contacts 1275, 1311 and 1233. This cancels automatic ringing since contacts 1271 and 1273 are open. Operator OP410 may initiate ringing by operating the ring start key RS410 (see section entitled "Ring Control"). Relay 860 operates from grounded (+) through operated contacts 514, normally closed contacts 429B, operated contacts 687 over conductors HS2 and HS1, operated contacts 729A, brush BR714, conductor HS6, operated contacts 817 and 845, and through the winding of relay 860 to (−) battery. Operation of relay 860 energizes shunt relay 950 from grounded (+) through operated contacts 862, 843 and 815. Relay 950 operates and transfers the holding circuit for relay 1140 to (−) battery through resistor R910 and contacts 911. Relay 860 opens the holding path for relay 1150 at contacts 861. Relay 1150 and its slave 1120 restore to connect grounded (+) through operated contacts 1134, normally closed contacts 1123 and the conductors HS7 and HS3 to operate relay 1310 which in turn opens contacts 1311 thereby releasing ring relay 1270 to close contacts 1271 and 1273 thereby starting ringing.

Coin collection on a toll call is provided when trunk circuits 900 and 1000 are used. The operator connects grounded (+) to the conductor HS (see section entitled "Coin Control") to operate relay 860 which in turn opens contacts 861 to cause relay 1140 to remain operated while relays 1150 and 1120 restore. Grounded (+) is connected to conductor HS7 via contacts 1134 and 1123 to cause connector switch 1200 to complete the coin collection function, as described under "Coin Control." It might be noted that in both ring control and coin collect a grounded (+) signal is extended over conductor HS7. If the called party has not yet answered, answer bridge relay 1210 has not yet opened contacts 1215 and therefore conductor HS7 is connected through contacts 1349C to operate relay 1310 to start ringing; whereas, if the called party has answered, answer bridge relay 1210 is operated to open contacts 1215 and close contacts 1216 so that conductor HS7 is connected to relay 1410 via contacts 1258, thereby completing a coin control path.

For coin refund on toll calls, the operator connects grounded (+) to incoming conductors T3 and R3 to restore relay 910 and to hold relay 920. Restoration of relay 910 operates relay 950 via contacts 913, 843, and 815. Relay 910 also opens the holding circuit for relay 1140 at contacts 911. Relay 1140 restores slow release relay 1040 to connect grounded (+) through normally closed contacts 1024 and 1041, operated contacts 1122 and 1133, to the holding loop circuit across outgoing conductors T3 and R3 to connector switch 1200, to complete the coin refund function, as previously described in the section on "Coin Control." Contacts 1141 and 1151 are in parallel during coin collect and coin refund so that a pulse will not be transmitted over the talking conductors to connector 1200 regardless of which calling bridge relay might be released.

Means is provided for automatically collecting coins at termination of toll calls. To explain automatic coin collect control, it is assumed that the call includes operator OP410, outgoing trunk 500, selector S700, cable 800, and connector 1200. When the connector switch is restored at the completion of a call (see section headed "Release" above) slow release relay 1430 is energized from grounded (+) through normally closed contacts 1221 and 1231, operated contacts VON1213 and 1255, and through the winding of relay 1430 to (−) battery. Operation of relay 1430 energizes relay 1440 from grounded (+) through operated contacts 1234, 1349 and 1431 and through the winding of relay 1440 to (−) battery. Relay 1440 restores relay 1250 by opening its holding circuit at contacts 1444 in addition to which relay 1440 also completes a holding circuit via contacts 1431 and 1349 for relays 1340 and 1440 through contacts 1445 to grounded (+). Relay 1410 is operated from grounded (+) through contacts 1442. Operation of relay 1410 connects coin collect battery, as previously described, to conductors T4 and R4 for automatic coin collection while relays 1270, 1430 and 1440 are restoring.

There is no automatic coin collection on intertoll trunk calls. It will be noted from the next preceding paragraph that automatic collect is initiated by the operation of slow release relay 1430. The circuit for operating this relay includes contacts 1255 which must be closed by a prior operation of relay 1250 since if these contacts are not closed, the circuit is completed directly to release magnet M1313 via contacts 1254. In setting up toll calls, a preliminary marking is extended over the HS conductors from Fig. 4 to Fig. 12 before connector switch 1200 is operated. At this time, a circuit is completed through contacts 1215 and 1263 to operate ringing relay 1270 which closes contacts 1276 thereby extending a grounded (+) marking from contacts 1349A through windings 1250B and 1240B to (−) battery thereby causing relay 1250 to operate and lock at contacts 1257. This closes contacts 1255 and therefore connector 1200 may not release until relay 1430 operates to collect coins. Contrast this with an intertoll call wherein no preliminary marking is extended over the various HS conductors for operating relay 1270. This means that contacts 1276 do not operate until after the connector has switched through upon seizure of a called line. That is, if the called line is idle, a circuit is completed through brush BR1413 and contacts 1332 to winding 1340A thereby causing this relay to operate and close contacts 1343 and 1344 at which time ring relay 1270 operates. Contacts 1276 close; however, contacts 1349A have already opened. Thus, relay 1250 does not operate and contacts 1255 do not close on intertoll calls; hence there is no automatic collect.

For a description of coin control on toll calls, see the section headed "Toll Marking."

While I have shown and described a particular embodiment of my invention, it will be obvious to those skilled in the art that changes and modifications may be made without departing from my invention in its broader aspects. I therefore aim to cover in the appended claims all such changes and modifications as fall within the true spirit and scope of my invention.

What I claim is:

1. In a telephone system, a plurality of telephone circuits, means including a directively controlled electro-mechanical switch for interconnecting at least two of said telephone circuits, circuit means for transferring energy between said circuits through said switch, said telephone circuits having different classes of transmission level characteristics, said switch including level marking means for determining the class of said characteristics of that one of said circuits to which said switch has been directed, means consisting of a pad of resistors for controlling the level of energy transmission through said switch and means for selectively including said last named means in said energy transferring circuit responsive to said level marking means.

2. The device of claim 1 wherein said means for determining the class of the circuit to which the switch has been directed comprises a level marking wiper and an associated bank of contacts, said electro-mechanical switch being the type which has primary and secondary motion and means carried by said electro-mechanical switch for selectively closing a circuit including said wiper and one of said contacts when said switch reaches a given position on its primary motion for rendering said last-named means effective.

3. In a telephone system, an electro-mechanical switch, a bank of talking and control contacts accessible to said switch, said bank of contacts being divided into a plurality of levels, talking and control wipers carried by said switch, a talking circuit, means for directively moving said wipers in a primary motion to engage one of said levels and subsequently in a secondary motion to engage a set of talking and control contacts in said selected level to complete said talking circuit, an auxiliary wiper and an associated bank of contacts, each contact therein being individual to one of said levels, means for driving said auxiliary wiper over said associated bank of contacts simultaneously with said primary switch motion, a pad consisting of a plurality of resistors, a pad control relay, means responsive to said auxiliary brush engaging a marked one of said associated bank of contacts for operating said relay, and means responsive to the operation of said relay for inserting said pad of resistors in said talking circuit.

References Cited in the file of this patent

UNITED STATES PATENTS

| | | |
|---|---|---|
| 2,398,854 | Ray | Apr. 23, 1946 |
| 2,580,809 | Wicks | Jan. 1, 1952 |